(12) United States Patent
Egendorf

(10) Patent No.: US 6,976,008 B2
(45) Date of Patent: *Dec. 13, 2005

(54) INTERNET BILLING METHOD

(75) Inventor: Andrew Egendorf, Lincoln, MA (US)

(73) Assignee: Netcraft, Corporation, Lincoln, MA (US)

( * ) Notice: Subject to any disclaimer, the term of this patent is extended or adjusted under 35 U.S.C. 154(b) by 290 days.

This patent is subject to a terminal disclaimer.

(21) Appl. No.: 09/975,839

(22) Filed: Oct. 11, 2001

(65) Prior Publication Data

US 2002/0032654 A1 Mar. 14, 2002

Related U.S. Application Data

(63) Continuation of application No. 09/568,925, filed on May 11, 2000, which is a continuation of application No. 09/057,230, filed on Apr. 8, 1998, now Pat. No. 6,188,994, which is a continuation of application No. 08/499,535, filed on Jul. 7, 1995, now Pat. No. 5,794,221.

(51) Int. Cl.[7] ............................................. G06F 17/60
(52) U.S. Cl. .............................. 705/40; 705/41; 705/42
(58) Field of Search .............................. 705/40, 41, 42

(56) References Cited

U.S. PATENT DOCUMENTS

| | | | | | |
|---|---|---|---|---|---|
| 3,573,747 A | * | 4/1971 | Adams | .................... | 340/172.5 |
| 5,146,491 A | * | 9/1992 | Silver et al. | ................. | 379/114 |
| 5,329,589 A | * | 7/1994 | Fraser et al. | ............. | 379/91.02 |
| 5,394,324 A | * | 2/1995 | Clearwater | ..................... | 705/8 |
| 5,446,489 A | * | 8/1995 | Egendorf | ........................ | 348/3 |
| 5,737,414 A | | 4/1998 | Walker et al. | ................. | 380/4 |
| 5,845,265 A | | 12/1998 | Woolston | ..................... | 705/37 |

OTHER PUBLICATIONS

Carnegie Mellon University, "Internet billing Server Prototype Scope Document INI Techinical Report 1993–1" (Oct. 14, 1993).*

* cited by examiner

Primary Examiner—V. Millin
Assistant Examiner—Daniel S. Felten
(74) Attorney, Agent, or Firm—Hogan & Hartson L.L.P.

(57) ABSTRACT

An Internet billing method comprises establishing an agreement between an Internet access provider and a customer, and an agreement between the Internet access provider and a vendor, wherein the Internet access provider agrees with the customer and the vendor to bill the customer and remit to the vendor for products and services purchased over the Internet by the customer from the vendor. The provider creates access to the Internet for the customer. When the customer orders a product or service over the Internet from a vendor, transactional information transmitted between the customer and the vendor is also transmitted to the provider. The provider then bills the transaction amount to the customer and remits a portion of the transaction amount to the vendor, keeping the differential as a fee for providing the service. As a result of this method, there is no need for any customer account numbers or vendor account numbers to be transmitted over the Internet, thereby maintaining the security of that information.

94 Claims, 3 Drawing Sheets

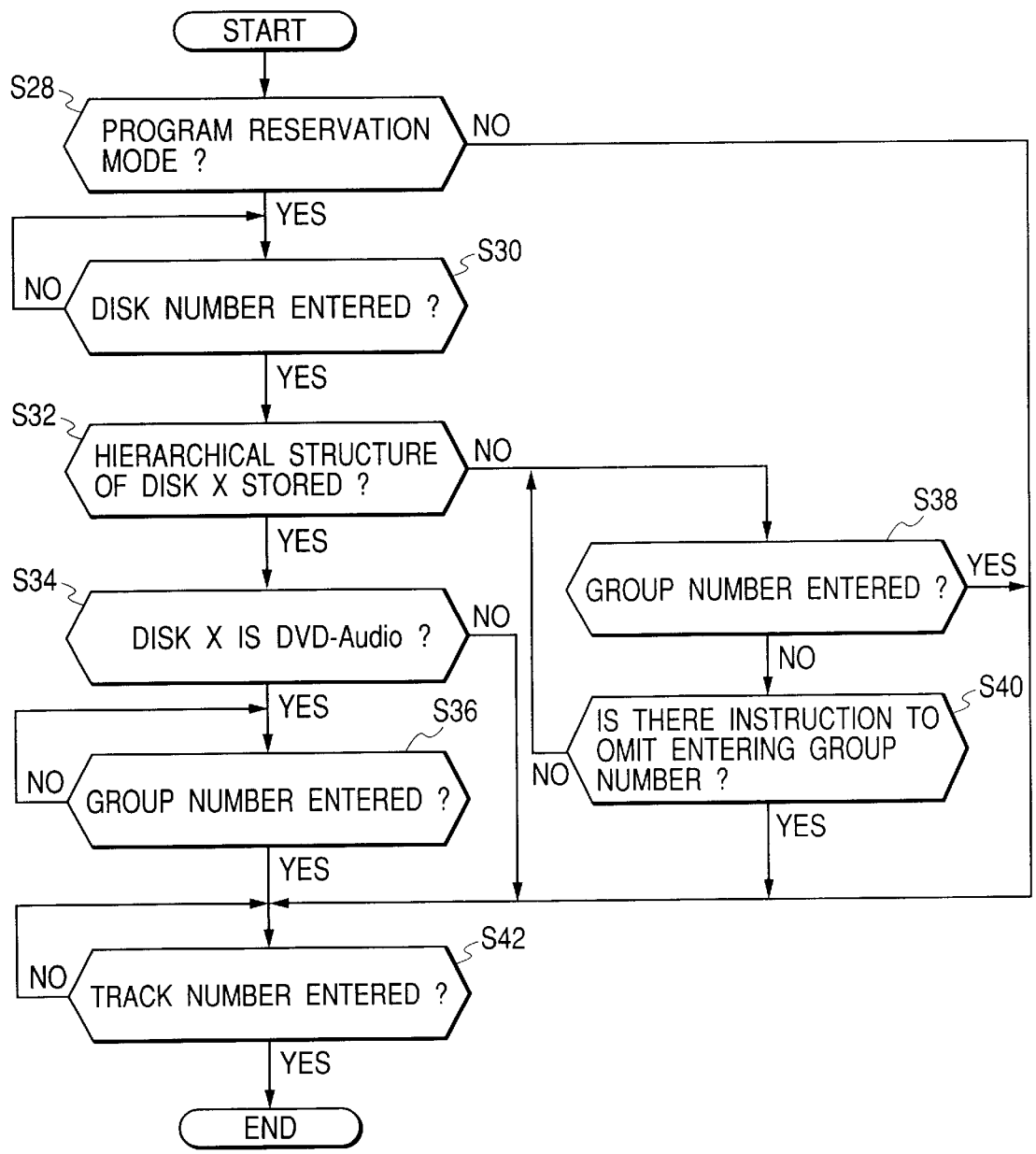

INTERNET BILLING METHOD

This application is a continuation application of application Ser. No. 09/568,925 filed May 11, 2000 and now pending, which is a continuation of application Ser. No. 09/057,230 filed Apr. 8, 1998 now U.S. Pat. No. 6,188,994, which is a continuation of application Ser. No. 08/499,535 filed Jul. 7, 1995 now U.S. Pat. No. 5,794,221.

BACKGROUND OF THE INVENTION

The present invention relates to a method of billing for commercial transactions over the Internet.

The Internet is a vast worldwide interconnection of computers and computer networks. The Internet does not consist of any specific hardware or group of connected computers, rather it consists of those elements that happen to be interconnected at any particular time. The Internet has certain protocols or rules regarding signal transmission and anyone with the proper hardware and software can be part of this interconnection.

At present, the technical and financial requirements for connecting directly to the Internet are beyond the resources of most individuals and thus new businesses known as Internet access providers have proliferated. These providers invest in the equipment needed to provide access to the Internet for subscribers who pay the providers a fee for the access. Providers include companies whose only business is to offer connection to the Internet, as well as on-line services such as Compuserve, American On-Line, and Prodigy. In addition, telephone companies and cable television companies nave announced plans to provide Internet access. A party desiring to connect to the Internet by means of a provider typically connects via a modem over a telephone network to the provider's equipment which then connects the party, through the provider's equipment, to the Internet.

Although the origin of the Internet was for military use, today the primary users of the Internet are civilian. There is great activity at present attempting to utilize the Internet as a channel of commerce.

Many vendors advertise their products and services over the Internet and solicit orders from Internet users for these wares. While the preferred mode of payment is by credit card, there is great reluctance to transmit credit card account information over the Internet because of lack of security. Moreover, in situations wherein the transaction amount is small—from pennies to a few dollars—it is not economically feasible to use a credit card transaction. There is a need to be able to ensure that commercial transactions over the Internet are at least as secure as conventional transactions over the telephone, through the mails, and with on-line services where credit cards and/or billing accounts are used for purchases. Similarly, there is a need to be able to handle on the Internet a large number of small-sized transactions, similar to what is done by telephone companies for conventional telephone services.

The lack of security and the lack of a means to bill for small transactions are the biggest obstacles to commercial use of the Internet.

SUMMARY OF THE INVENTION

The main object of the present invention is to create a new business opportunity for telephone companies, cable television companies, existing Internet access providers, and companies offering financial services by creating a way for them to offer to their subscribers a method of securely buying and selling goods and services of any value over the Internet.

Another object of the present invention is an Internet billing method which is cost effective for transactions having transaction amounts ranging from pennies to a few dollars.

Still another object of the present invention is to provide a secure method of billing commercial transactions over the Internet.

A further object of the present invention is an Internet billing method which is simple to use from both the customer's point of view and that of vendors on the Internet.

Yet another object of the present invention is a billing method which can be used by a large number of exxisting Internet users without requiring major changes in how the users customarily behave and conduct commercial transactions.

These and other objects and advantages of the present invention are achieved by an Internet billing method in accordance with the present invention. A provider establishes an agreement with a customer, and a second agreement with a vendor, wherein the provider agrees with the customer and the vendor to bill for products and services purchased over the Internet by the customer from the vendor. Associated with the customer agreement are one or more billing accounts to which purchases may be charged. Associated with the vendor agreement are one or more methods of remitting funds to the vendor. The provider creates access to the Internet for the customer through the provider's equipment. When the customer orders a product or service over the Internet from the vender, the provider obtains transactional information transmitted between the customer and the vendor including a transaction amount relating to the ordered product or service and the provider then bills the transaction amount to a customer billing account and remits a portion of the transaction amount to the vendor.

Which accounts are used may be specified in the agreements made between the provider and the customer and between the provider and the vender, or may be specified in the transactional information. If specified in the transactional information, the selection of account can be made by referencing the type of account (e.g., "VISA", "phone bill"), or the position of that account on a predetermined list (e.g., "the 3rd account"), and does not require that any actual account numbers be transmitted.

By the use of this method, there is no need for the customer to transmit over the Internet any information containing any of the customer's billing account numbers thereby maintaining the security of that information.

The present invention, in a preferred embodiment, is a method of providing merchants with the ability to offer customers secure transactions for the purchase of goods and services of any value over the Internet, without the need for the customer to transmit any credit card or other account numbers over the Internet, without the need for the customer to sign up with any additional provider of services, and without the need to chance the manner in which most customers currently use the Internet.

In accordance with the present invention, a customer desiring to purchase goods and services over the Internet has prearranged access to the Internet through the services of an Internet access provider. Such providers can be, for example, companies whose only business is to offer connection to the Internet, companies which offer on-line computer services, one of which is connection to the Internet, cable television companies, or telephone companies. In arranging for access with such a provider, the customer has agreed with the provider on a method of payment which is, for example, by billing, or charge to a credit card, or charge to an account of the user which could be an account specific to the Internet or could be a more general account, such as an on-line computer services account, a cable television account, a telephone account, or a bank account.

Once the prearrangements have been completed, using the provider's service to connect to the Internet typically involves calling a telephone number of the provider and being automatically connected through the provider's equipment to the Internet.

Once connected to the Internet, the customer can browse around until an item is located that the customer wishes to purchase, at which time the customer will follow the instructions created by the vendor, exchange transactional information, and ultimately agree to purchase something by taking an appropriate action. In the course of making the purchase, the means of delivery of the goods or service will be established. Depending on the type of goods, delivery can be made, for example, by mail (e.g., in the case of a purchase of a book), by courier service (e.g., in the case of a purchase of flowers), or by electronic transmission over the Internet (e.g., in the case of delivery of an electronic newsletter or piece of software). The remaining element of the purchase transaction is the manner in which the customer pays the vendor.

In accordance with the present invention, the provider has made arrangements with vendors who wish to sell goods and services over the Internet to the customers of the provider. The provider agrees to the billing associated with such sales for the vendors, and as part of the agreement, the provider and the vendor have agreed on the manner in which the provider will remit funds to the vendor. Examples of payment include payment by check, credit to the vendor's credit card merchant account, or credit to another account of the vendor's, such as the vender's cable television account, telephone account, or bank account. The account of the vendor to be credited need not be with the provider. The arrangements that are made will depend on the vendor's desires and the capabilities of the provider. For example, if the vendor anticipates many small transactions and the provider is a telephone company, they can agree that the provider will credit the vendor's existing telephone account for amounts under some nominal amount and credit the vendor's credit card merchant account for larger amounts. If the vendor anticipates large transactions, then they may agree that the provider will pay by check or direct credit to the vendor's bank account.

In a typical transaction in accordance with the present invention, from the customer's point of view all use of the Internet appears to be conventional. Depending upon the prearrangements made between the provider and the customer and between the provider and the vendor, the customer can charge a purchase, or example, to a credit card, to a cable television account, to a telephone account or o a bank account. The account of the customer to be billed need not be with the provider. For example, the customer may be using one telephone company as an access provider and a second telephone company as a telephone service provider and the account to be billed is that with the second telephone company. The customer specifies which account is to be billed by an indication to the provider, but neither the customer nor the vendor has to transmit any account numbers over the Internet, because it is the provider, to the vendor, who submits the charge to the credit card company, the cable television company, the telephone company, or to another account of the customer, or who debits the bank account of the customer, and the provider already has been given, during the course of making prearrangements with the customer and the vendor, the appropriate account numbers of both the customer and the vendor. The provider sends this information to the appropriate party, and may do so by the same secure means customarily used for similar transactions not make over the Internet.

From the vendor's point of view, the transaction is as secure as a transaction made over the telephone with a credit card. If the vendor wishes, the vendor may verify with the provider that the address supplied by the customer for shipment of the goods has been authorized by the customer in the same manner in which such verification would be made for the same transaction made over the telephone with a credit card. In addition, because such a verification does not require the transmission of any account numbers of the customer, the verification can be done over the Internet as part of the transaction transmission itself if the provider and the vendor have prearranged to do so.

From the provider's point of view, the provider is made aware that the customer has authorized the charge by monitoring the data being sent over the Internet through the provider's equipment between the customer and the vendor. This can be done, for example, by specifying a specific code which, when sent between the customer and the vendor, indicates to the provider that a transaction has been completed. When the customer has made a purchase, the provider charges the transaction amount to the agreed account of the customer and remits the agreed portion of that amount to the vendor, keeping the differential as the provider's charge for making the service available.

These and other features and advantages of the present invention will become apparent from the following detailed description of the invention with reference to the attached drawings, wherein:

DETAILED DESCRIPTION OF THE INVENTION

Figure 1:
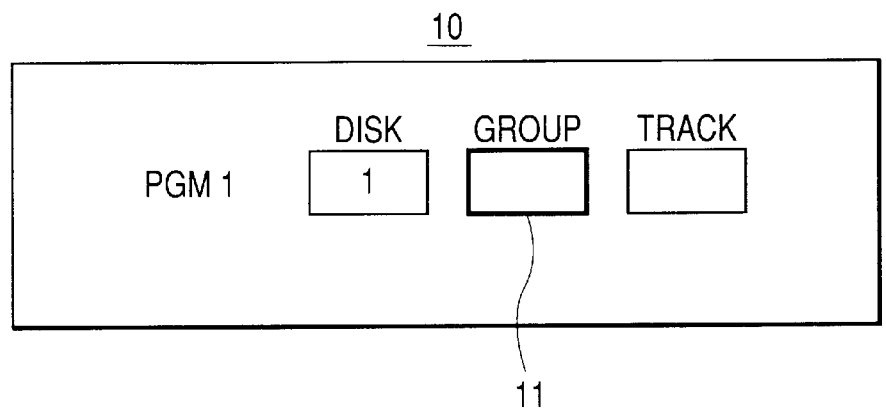
FIG. 1 is a block diagram of a system for carrying out the billing method according to the present invention.

Referring to FIG. 1, a system for carrying out the method of the present invention is shown. In that system, the Internet is shown schematically as network 1 to which providers 2, 9, vendors 5.1–5.$n$, 6.1–6.$n$ and 8.1–8.$n$, and customers 4.1–4.$n$ and 10.1–10.$n$ (where n is an integer to indicate a range from one to many) are connected in different ways.

Provider 2 is connected to access network 3 and the Internet 1 and providers access to the Internet 1 for customers 4.1–4.$n$ and vendors 6.1–6.$n$ connected to access network 3. Access network, an on-line services network such as Compuserve, American On-Line, or Prodigy, r a private Internet access network. Similarly, provider 9 is connected to access network 7 and the Internet 1 and provides access to the Internet 1 for customers 10.1–10.$n$ and vendors 8.1–8.$n$. Vendors 5.1–5.$n$ access the Internet directly by their own equipment.

Figure 2:
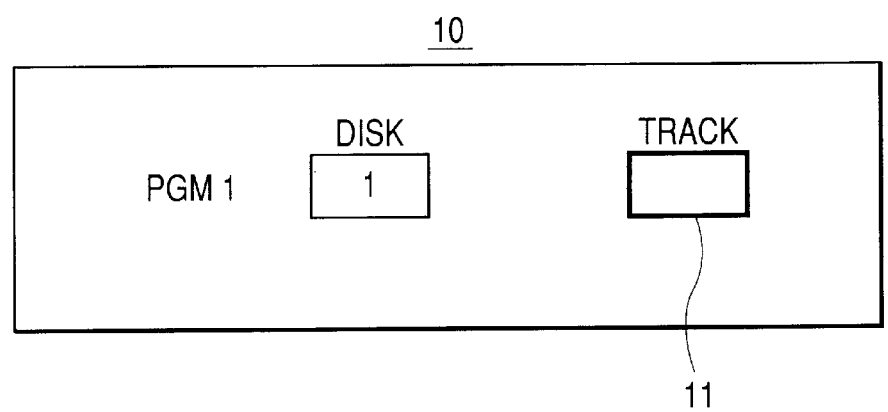
FIG. 2 is a flow chart of one embodiment of the method according to the present invention.

In accordance with the method shown in the flow chart of FIG. 2, for example, in step 11 provider 2 establishes agreement with vendors 5.1–5.$n$ who are connected directly to the Internet, with vendors 6.1–6.$n$ who access the Internet via access network 3 and provider 2, and with vendors 8.1–8.n who are connected to the Internet 1 via access network 7 and provider 9, to bill customers 4.1–4.n for goods and services purchased by them over the Internet from vendors 5.1–5.n, 6.1–6.n and 8.1–8.n. Provider 2 also agrees to remit a portion of the collected money back to the vendors. Provider 2 also establishes an agreement with each of customers 4.1–4.n. These agreements provide that the provider will bill the customer for goods and services purchased by them over the Internet. The billing will be done to billing accounts established in connection with the agreements. The billing accounts can be, for example, credit card accounts, telephone accounts, cable television accounts, on-line services accounts, or bank accounts. The accounts need not be with the provider if the provider has a billing agreement in place with the party with whom the account was established.

As part of the services of the provider to customers 4.1–4.n, the customer is connected to the Internet 1 in step 12 at a desired time, typically by making contact via modem. Once connected to the Internet, the customer can interface with any one of vendors 5.1–5.n, 6.1–6.n and 8.1–8.n in order to find out about products or services offered by those vendors.

When one of customers 4.1–4.n makes the decision to order a product or service form one of vendors 5.1–5.n, 6.1–6.n and 8.1–8.n, in step 13 an exchange of transactional information occurs between the customer and the vendor. This exchange may include identifying information relating to the customer, such as the customer's Internet address, information relating to the products or services to be purchased, including the transaction amount, the manner and time of delivery, and a reference number to identify the order. The vendor or the customer also can produce a verification code signifying that a transaction has been completed which can be received by provider 2.

In step 14, the transactional information is obtained by provider 2. The communication can be a separate transmission by the vendor or the customer to provider 2, or provider 2 can extract the information from the vendor through equipment of provider 2. Provider 2 can then send verifying information to one or both of the customer and vendor to indicate that the transaction has been approved, if approval of a third party, such as credit card company, is required. Most importantly, the entire transaction takes place without the need of communicating the customer's credit card or other account number over the Internet 1.

The product or service is delivered to the customer in step 15 and the appropriate customer account is billed by provider 2 in step 16. Provider then remits the agreed payment in the appropriate manner to the vendor in step 17, keeping the differential as a service charge for the services rendered by provider 2. Steps 15, 16 and 17 may be performed in any order.

Figure 3:
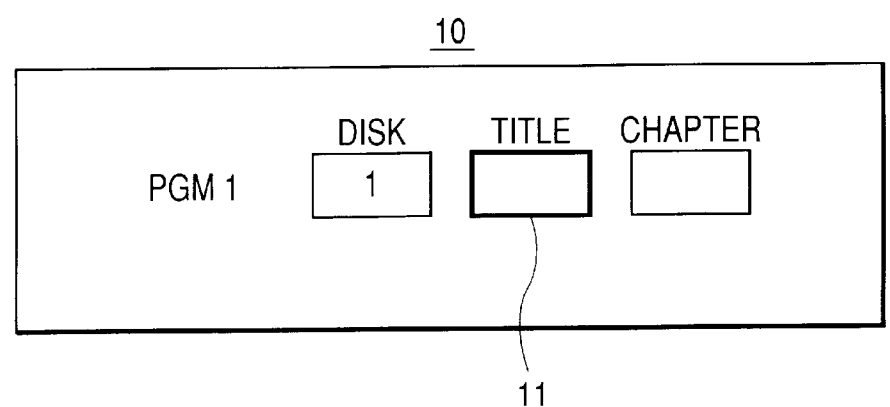
FIG. 3 is a flow chart of another embodiment of the method according to the present invention.
Figure 4:
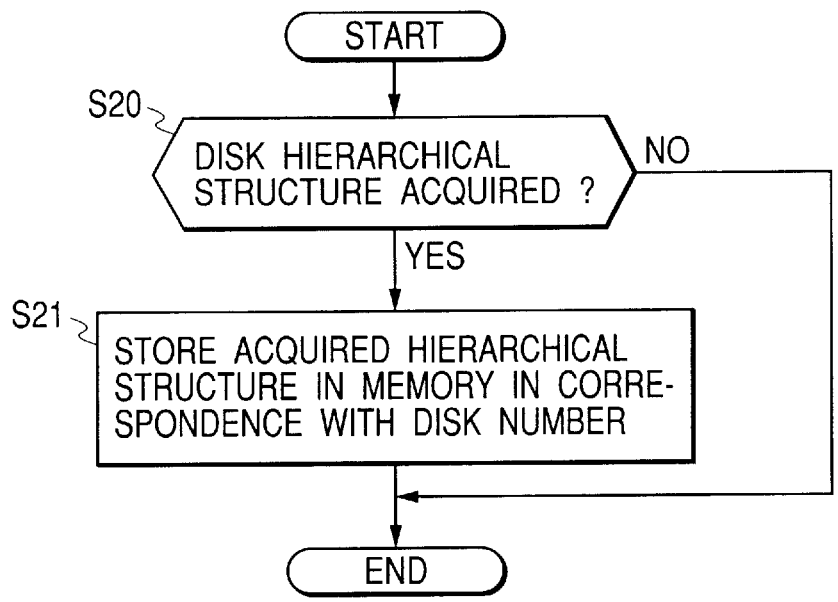
Figure 5:
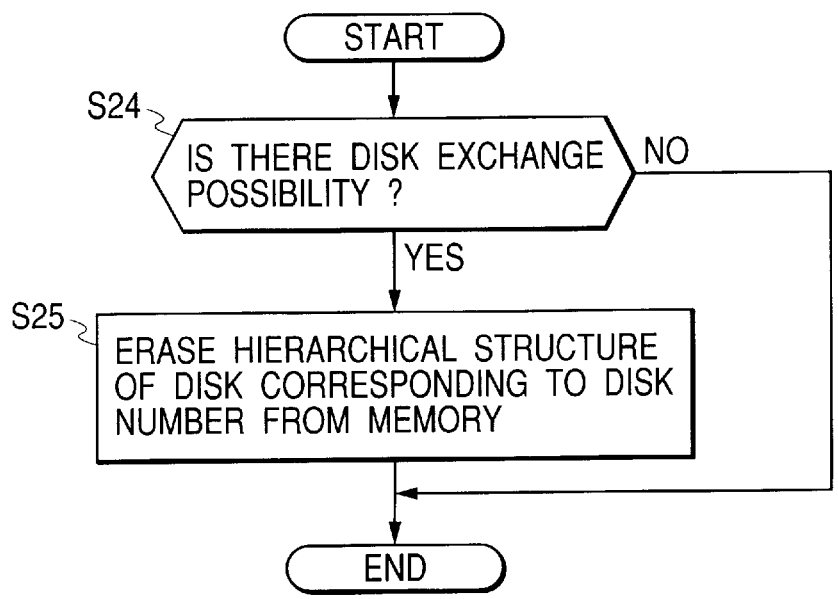
Figure 1:
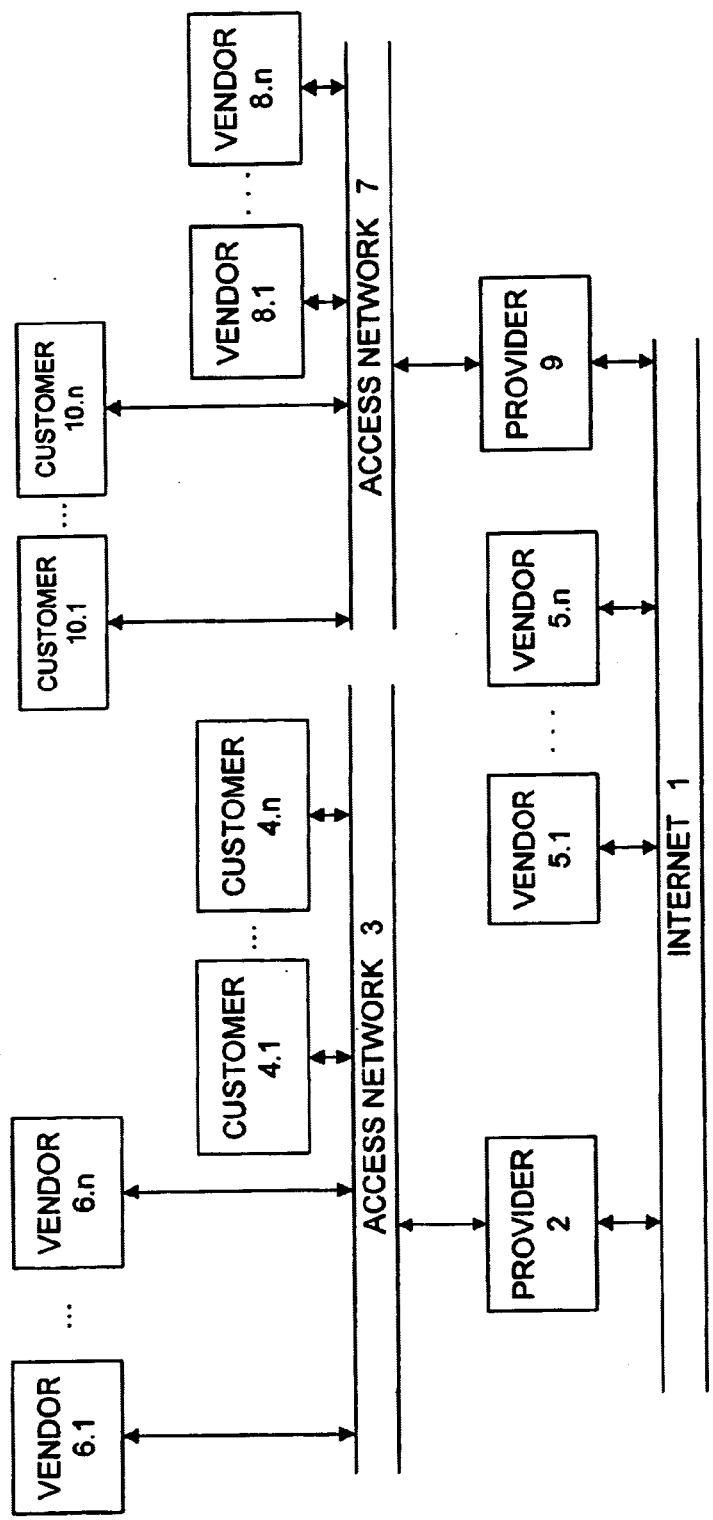
Figure 2:
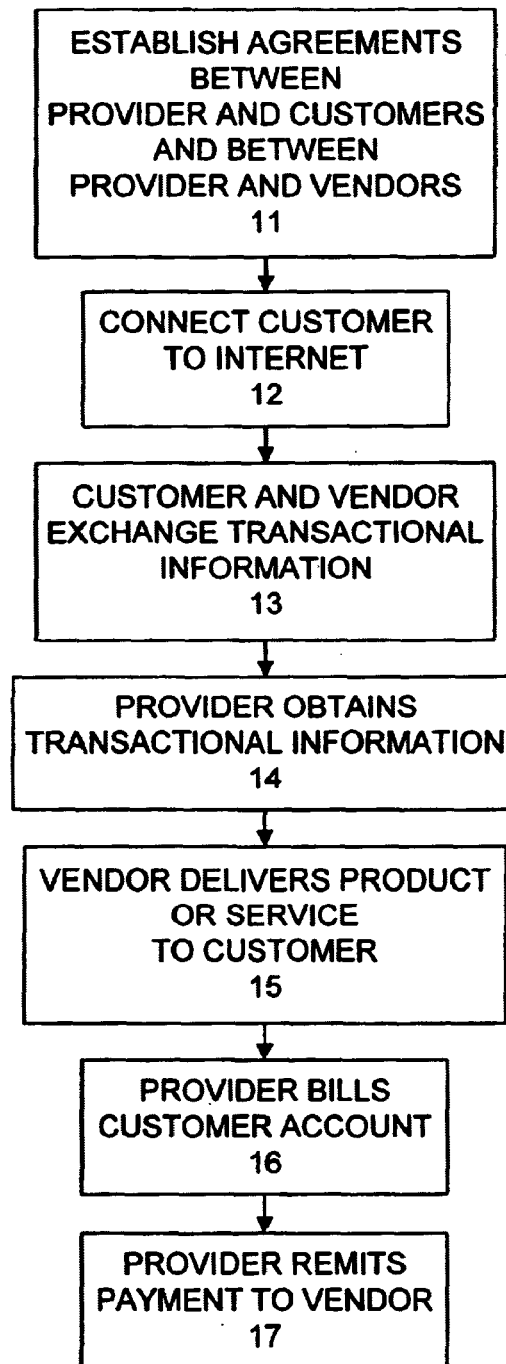
Figure 3:
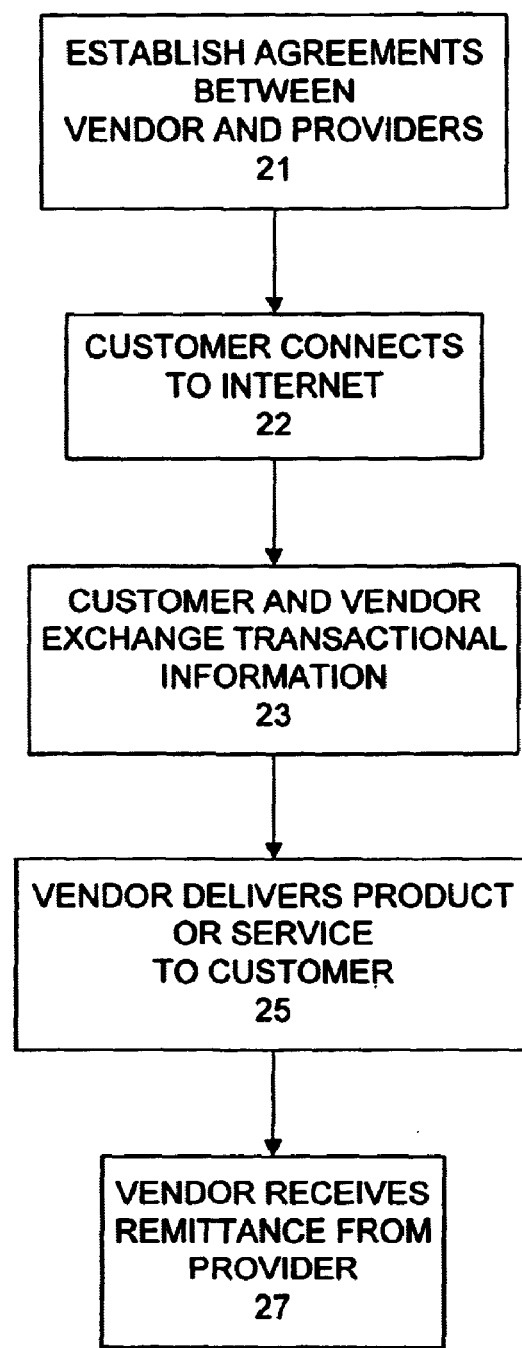
Figure 1:
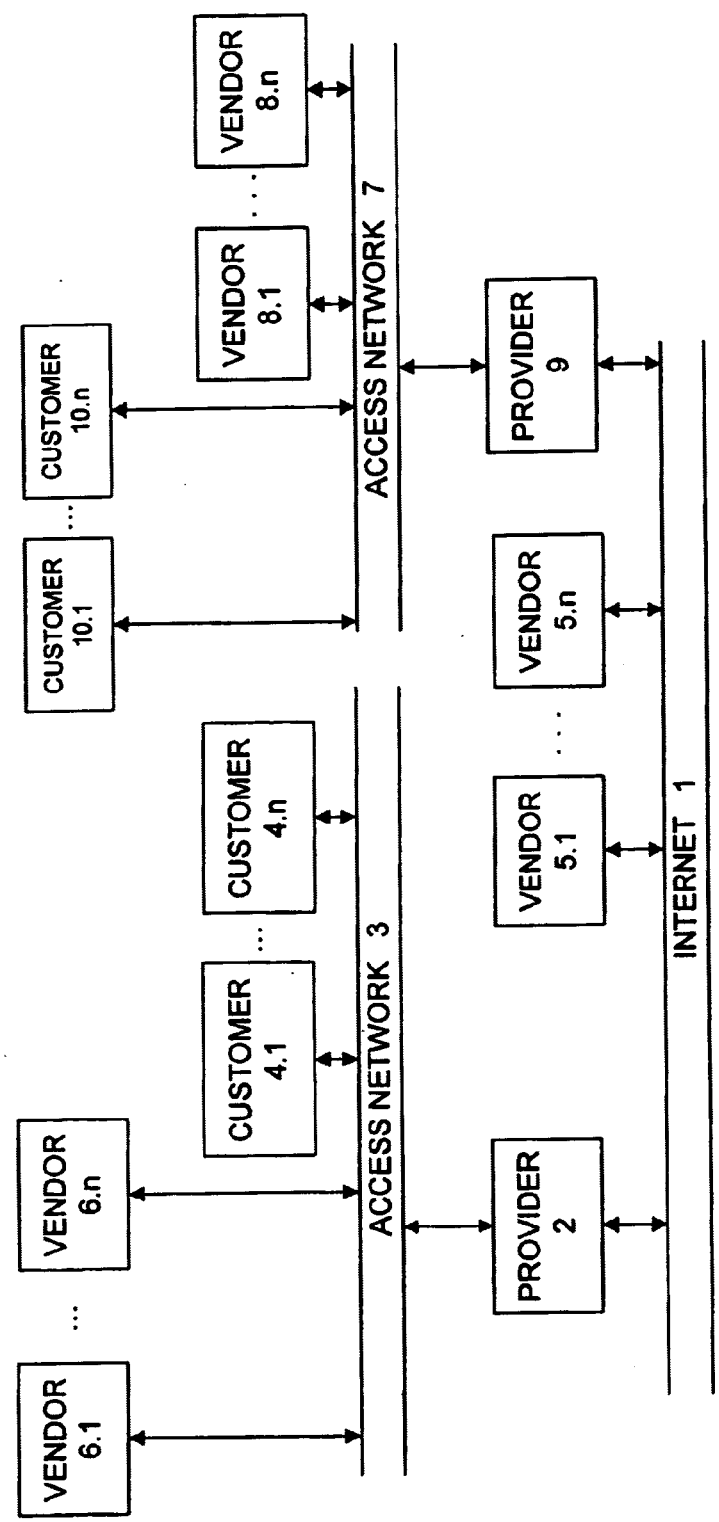
Figure 2:
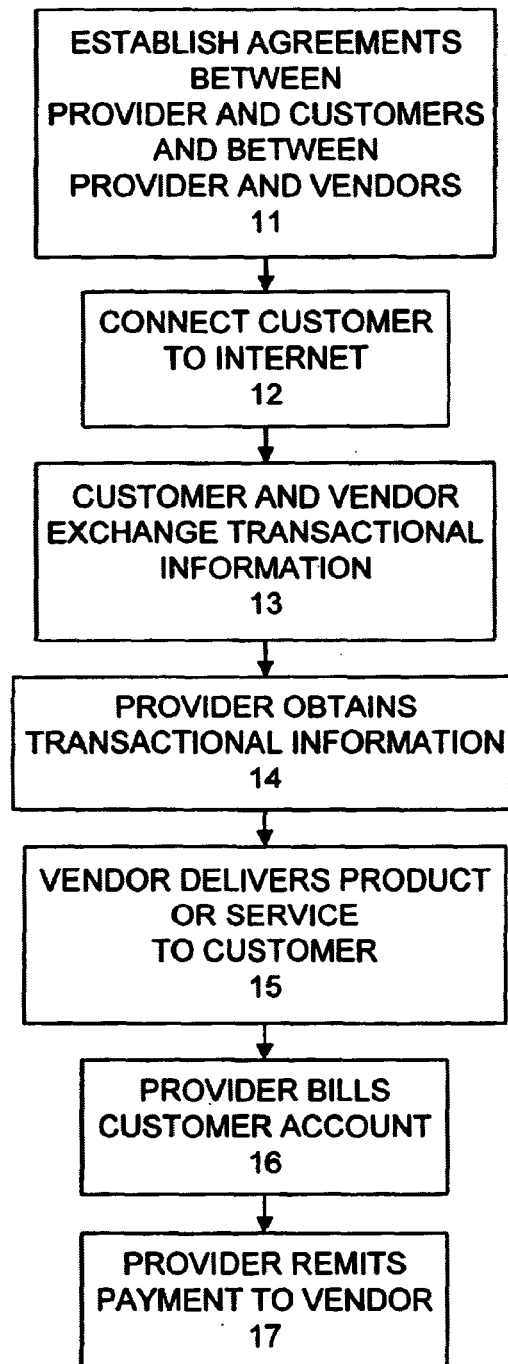
Figure 3:
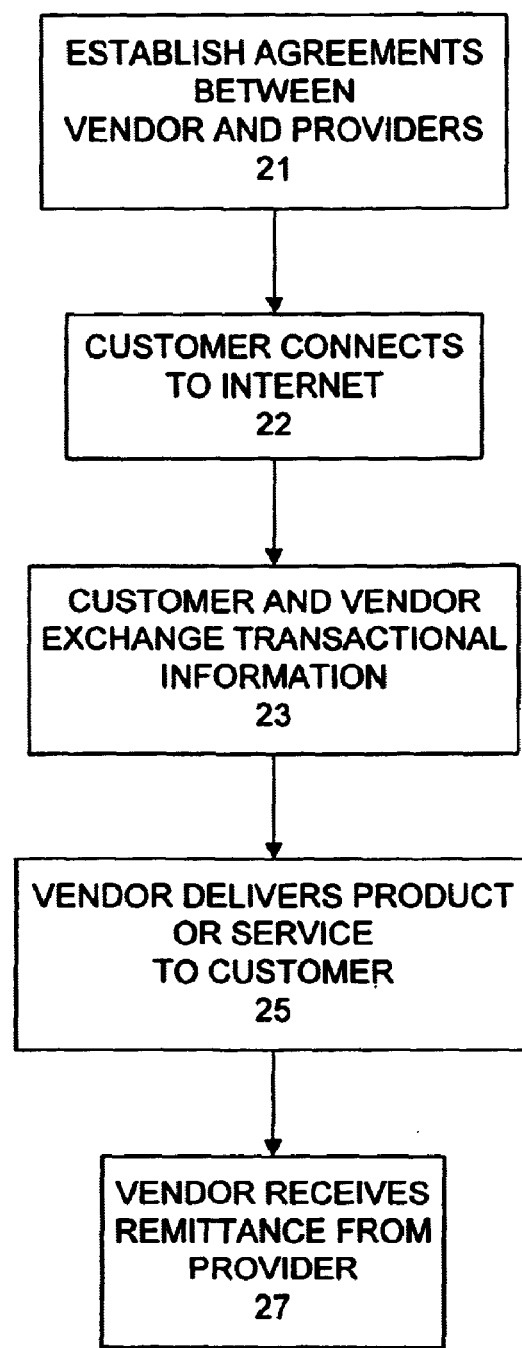

As can be seen from FIG. 1, the method according to the present invention can be carried out in many ways. For example, referring to FIG. 3, vendor 5.1 in step 21 can establish remitting agreements with provider 2 and provider 9 to remit to vendor 5.1 a portion of a transaction amount billed to the billing account of any one of customers 4.1–4.nand 10.1–10.n.

Similarly, each of vendors 6.1–6.n can establish a remitting agreement with provider 9 for transactions carried out over the Internet between each of vendors 6.1–6.n and customer 10.1–10.n.

A customer connects to the Internet is step 22. The customer exchanges transactional information with the vendor in step 23 and the vendor delivers a product or services to the customer in step 25, either before or after the vendor receives remittances from the provider in step 27.

In accordance with another feature of the present invention, prior to the billing of the transaction amount to the account of the customer, and after obtaining the transactional information, the provider can obtain approval form a third party to bill the transaction amount to the billing account. This is particularly true in the case where the billing account is a credit card account or a bank account. In that instance, approval must be obtained from a third party, i.e., the bank issuing the credit card or with whom the bank account was established. Where the account is with the provider, approval would be obtained form the provider itself. In a preferred embodiment of the present invention, the approval can be obtained over the Internet and most preferably during the communication between the customer and the vendor.

In accordance with a further feature of the present invention, the customer can specify a particular billing account, for example, a credit card account, a bank account, a telephone number account, a cable television account or an on-line services account at the time that the billing agreement is established with the provider. The specification can provide that one account will be sued for certain transactions, and a different account for other transactions, for example, a telephone account for transactions less than $5.00, and a bank account for transactions of at least $5.00. Thereafter, whenever the transaction amount is to be billed, it will be billed to that specified billing account. Alternatively, the customer can specify a plurality of billing accounts, for example, an AMEX account, a VISA account, a Mastercard account at the time that the billing agreement is established. When the transactional information is communicated, it will include an identification of which of those plurality of billing accounts the customer wants billed, without, however, specifying the account number of the account. Thus the customer can merely indicate the account by the "brand" name AMEX, VISA, Mastercard or the customer can identify it as the first account, second account or third account on a list previously established with the provider.

As noted above, the billing account is not necessarily with the provider, that is, t can be with a third party such as a bank issuing a credit card, or a bank at which the customer has a bank account. Alternatively, the provider can be a first telephone company, but the billing account can be with a second telephone company and charged by the first telephone company to the telephone number account of the customer with the second telephone company, as is customarily done in connection with conventional telecommunications services.

In accordance with the invention, the remitting can be by means of sending money or by crediting a vendor account such as a credit card merchant account, a bank account, a telephone number account, a cable television account or a on-line services account.

In a preferred embodiment of the present invention, the step of establishing the remitting account comprises specifying a particular vendor account to which the portion of the transaction amount will be remitted. The specification can provide that one account will be used For certain transactions, and a different account for other transactions, for example, a telephone account for transactions less than $5.00, and a bank account for transactions of at least $5.00. In an alternative embodiment of the present invention, the step of establishing the remitting agreement comprises the vendor specifying a plurality of vendor accounts to which a portion of the transaction account can be remitted. Thus when the transactional information is communicated, the vendor can identify which one of the plurality of vendor accounts the amount is to be remitted to without, however, specifying the specific account number.

The vendor amount can be an account with the provider or an account with the third party such as a credit card merchant account, or bank account, with a bank, or a cable television account with a cable television company.

It is understood that the embodiments described hereinabove are merely illustrative and are not intended to limit the scope of the invention. It is realized that various changes, alterations, rearrangements and modifications can be made by those skilled in the art without substantially departing from the spirit and scope of the present invention.

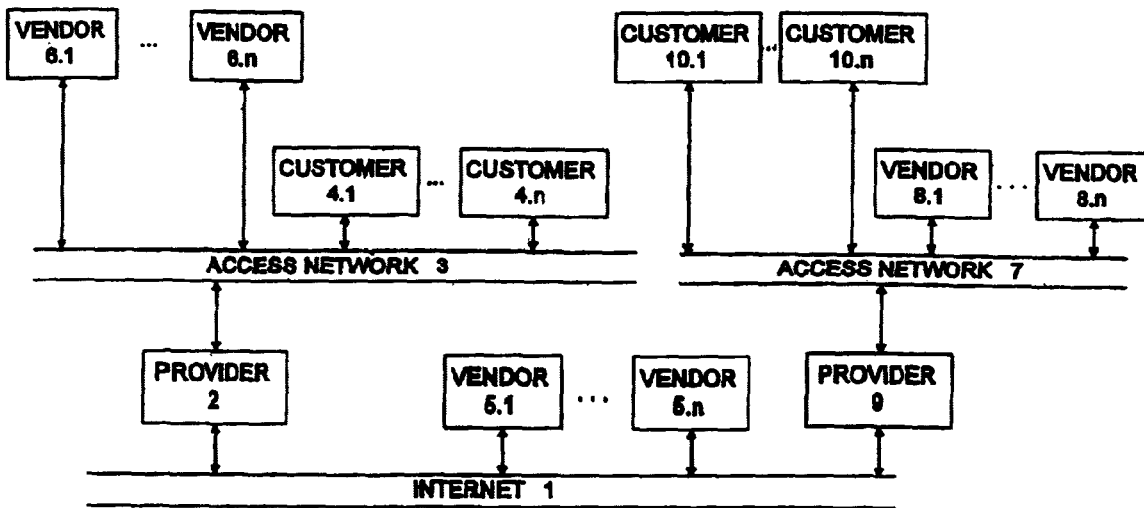

What is claimed is:

1. An Internet billing method for a plurality of customers and a plurality of vendors of products or services for transactions over the Internet between a purchasing customer of the plurality of customers and a selling vendor of the plurality of vendors, wherein, for each purchase transaction of a product or service between the purchasing customer and the selling vendor, a first amount is charged to the purchasing customer and a second amount is remitted to the selling vendor, the method comprising the steps by a third party to the purchase transaction of:
    a) establishing a billing agreement with the purchasing customer to permit the third party to charge the purchasing customer and to remit to a selling vendor for a purchase transaction;
    b) establishing a remitting agreement with the selling vendor to permit the third party to charge a purchasing customer and to remit to the selling vendor for a purchase transaction;
    c) providing a communications link through equipment of the third party between the purchasing customer and the selling vendor to permit the purchasing customer to communicate over the Internet with the selling vendor concerning the purchase transaction;
    d) receiving authorization over the Internet from the purchasing customer to charge the first amount to the purchasing customer without previously receiving a request from the selling vendor to charge the first amount to the purchasing customer;
    e) charging the first amount to the purchasing customer in accordance with the billing agreement; and
    f) remitting the second amount to the selling vendor in accordance with the remitting agreement,
    wherein after establishing the billing agreement the third party does not transfer ownership of the product or service from the selling vendor to the purchasing customer.

2. The method according to claim 1, wherein no credit card account number of the purchasing customer and no bank account number of the purchasing customer is transmitted over the Internet by the third party to the selling vendor prior to the step of remitting.

3. The method according to claim 1 or 2, wherein the third party is a cable television company, a company offering financial services, on Internet access provider, or a telephone company.

4. The method according to claim 3, further comprising the step of obtaining approval for charging the first amount from a party other than the purchasing customer and the selling vendor prior to the step of charging.

5. The method according to claim 4, wherein the party other than the purchasing customer and the selling vendor is a bank, a company offering financial services, a credit card company, an Internet access provider, or the third party.

6. The method according to claim 3, wherein the step of charging comprises sending a bill or charging an account with a bank, a cable television company, a company offering financial services, a credit card company an Internet access provider, a telephone company, or the third party.

7. The method according to claim 3, wherein the step of remitting comprises sending a check or crediting an account with a bank, a cable television company, a company offering financial services, a credit card company, an Internet access provider, a telephone company, or the third party.

8. The method according to claim 3, wherein the second amount is less than the first amount.

9. The method according to claim 3, wherein the step of remitting is performed before the step of charging.

10. An Internet billing method for a plurality of customers and a plurality of vendors of products or services for transactions over the Internet between a purchasing customer of the plurality of customers and a selling vendor of the plurality of vendors, wherein, for each purchase transaction of a product or service between the purchasing customer and the selling vendor, a first amount is charged to the purchasing customer and a second amount is remitted to the selling vendor, the method comprising the steps by a third party company offering financial services of:
    a) establishing a billing agreement with the purchasing customer to permit the company offering financial services to charge the purchasing customer and to remit to a selling vendor for a purchase transaction;
    b) establishing a remitting agreement with the selling vendor to permit the company offering financial services to charge a purchasing customer and to remit to the selling vendor for a purchase transaction;
    c) providing a communications link through equipment of the third party between the purchasing customer and the selling vendor to permit the purchasing customer to communicate over the Internet with the selling vendor concerning the purchase transaction;
    d) receiving authorization over the Internet from the purchasing customer to charge the first amount to the purchasing customer without previously receiving a request from the selling vendor to charge the first amount to the purchasing customer;
    e) charging the first amount to the purchasing customer in accordance with the billing agreement by charging a bank account, a credit card account, or an account with the company offering financial services; and
    f) remitting the second amount to the selling vendor in accordance with the remitting agreement without previously transmitting a credit card account number of the purchasing customer over the Internet to the selling vendor and without previously transmitting a bank account number of the purchasing customer over the Internet to the selling vendor,
    wherein after establishing the billing agreement the company offering financial services does not transfer ownership of the product or service from the selling vendor to the purchasing customer.

11. The method according to any one of claims 1, 2, and 10, wherein the step of receiving is preformed after the purchasing customer and the selling vendor have agreed to enter into the purchase transaction.

12. The method according to claim 3, wherein the step of receiving is performed after the purchasing customer and the selling vendor have agreed to enter into the purchase transaction.

13. The method according to claim 4, wherein the step of receiving is performed after the purchasing customer and the selling vendor have arced to enter into the purchase transaction.

14. The method according to claim 5, wherein the step of receiving is performed after the purchasing customer and the selling vendor have agreed to enter into the purchase transaction.

15. The method according to claim 6, wherein the step of receiving is performed after the purchasing customer and the selling vendor have agreed to enter into the purchase transaction.

16. The method according to claim 7, wherein the step of receiving is performed after the purchasing customer and the selling vendor have agreed to enter into the purchase transaction.

17. The method according to claim 8, wherein the step of receiving is performed after the purchasing customer and the selling vendor have agreed to enter into the purchase transaction.

18. The method according to claim 9, wherein the step of receiving is performed after the purchasing customer and the selling vendor have agreed to enter into the purchase transaction.

19. The method according to any one of claims 1, 2, and 10, wherein the step of establishing a remitting agreement does not require the third party to charge the purchasing customer.

20. The method according to claim 3, wherein the step of establishing a remitting agreement does not require the third party to charge the purchasing customer.

21. The method according to claim 4, wherein the step of establishing a remitting agreement does not require the third patty to charge the purchasing customer.

22. The method according to claim 5, wherein the step of establishing a remitting agreement does not require the third party to charge the purchasing customer.

23. The method according to claim 6, wherein the step of establishing a remitting agreement does not require the third party to charge the purchasing customer.

24. The method according to claim 7, wherein the step of establishing a remitting agreement does not require the third party to charge the purchasing customer.

25. The method according to claim 8, wherein the step of establishing a remitting agreement does not require the third party to charge the purchasing customer.

26. The method according to claim 9, wherein the step of establishing a remitting agreement does not require the third party to charge the purchasing customer.

27. The method according to claim 11, wherein the step of establishing a remitting agreement does not require the third party to charge the purchasing customer.

28. The method according to claim 12, wherein the step of establishing a remitting agreement does not require the third party to charge the purchasing customer.

29. The method according to claim 13, wherein the step of establishing a remitting agreement does not require the third party to charge the purchasing customer.

30. The method according to claim 14, wherein the step of establishing a remitting agreement does not require the third party to charge the purchasing customer.

31. The method according to claim 15, wherein the step of establishing a remitting agreement does not require the third party to charge the purchasing customer.

32. The method according to claim 16, wherein the step of establishing a remitting agreement does not require the third party to charge the purchasing customer.

33. The method according to claim 17, wherein the step of establishing a remitting agreement does not require the third party to charge the purchasing customer.

34. The method according to claim 18, wherein the step of establishing a remitting agreement does not require the third party to charge the purchasing customer.

35. The method according to any one of claims 1, 2, and 10, wherein after the step of establishing a billing agreement the third party does not approve an agreement between the purchasing customer and the selling vendor to enter into the purchase transaction.

36. The method according to claim 3, wherein after the step of establishing a billing agreement the third party does not approve an agreement between the purchasing customer and the selling vendor to enter into the purchase transaction.

37. The method according to claim 4, wherein after the step of establishing a billing agreement the third party does not approve an agreement between the purchasing customer and the selling vendor to enter into the purchase transaction.

38. The method according to claim 5, wherein after the step of establishing a billing agreement the third party does not approve an agreement between the purchasing customer and the selling vendor to enter into the purchase transaction.

39. The method according to claim 6, wherein after the step of establishing a billing agreement the third party does not approve an agreement between the purchasing customer and the selling vendor to enter into the purchase transaction.

40. The method according to claim 7, wherein after the step of establishing a billing agreement the third party does not approve an agreement between the purchasing customer and the selling vendor to enter into the purchase transaction.

41. The method according to claim 8, wherein after the step of establishing a billing agreement the third party does not approve an agreement between the purchasing customer and the selling vendor to enter into the purchase transaction.

42. The method according to claim 9, wherein after the step of establishing a billing agreement the third party does not approve an agreement between the purchasing customer and the selling vendor to enter into the purchase transaction.

43. The method according to claim 11, wherein after the step of establishing a billing agreement the third party does not approve an agreement between the purchasing customer and the selling vendor to enter into the purchase transaction.

44. The method according to claim 12, wherein after the step of establishing a billing agreement the third party does not approve an agreement between the purchasing customer and the selling vendor to enter into the purchase transaction.

45. The method according to claim 13, wherein after the step of establishing a billing agreement the third party does not approve an agreement between the purchasing customer and the selling vendor to enter into the purchase transaction.

46. The method according to claim 14, wherein after the step of establishing a billing agreement the third party does not approve an agreement between the purchasing customer and the selling vendor to enter into the purchase transaction.

47. The method according to claim 15, wherein after the step of establishing a billing agreement the third party does not approve an agreement between the purchasing customer and the selling vendor to enter into the purchase transaction.

48. The method according to claim 16, wherein after the step of establishing a billing agreement the third party does not approve an agreement between the purchasing customer and the selling vendor to enter into the purchase transaction.

49. The method according to claim 17, wherein after the step of establishing a billing agreement the third party does not approve an agreement between the purchasing customer and the selling vendor to enter into the purchase transaction.

50. The method according to claim 18, wherein after the step of establishing a billing agreement the third party does not approve an agreement between the purchasing customer and the selling vendor to enter into the purchase transaction.

51. The method according to claim 19, wherein after the step of establishing a billing agreement the third party does not approve an agreement between the purchasing customer and the selling vendor to enter into the purchase transaction.

52. The method according to claim 20, wherein after the step of establishing a billing agreement the third party does not approve an agreement between the purchasing customer and the selling vendor to enter into the purchase transaction.

53. The method according to claim 21, wherein after the step of establishing a billing agreement the third party does not approve an agreement between the purchasing customer and the selling vendor to enter into the purchase transaction.

54. The method according to claim 22, wherein after the step of establishing a billing agreement the third party does not approve an agreement between the purchasing customer and the selling vendor to enter into the purchase transaction.

55. The method according to claim 23, wherein after the step of establishing a billing agreement the third party does not approve an agreement between the purchasing customer and the selling vendor to enter into the purchase transaction.

56. The method according to claim 24, wherein after the step of establishing a billing agreement the third party does not approve an agreement between the purchasing customer and the selling vendor to enter into the purchase transaction.

57. The method according to claim 25, wherein after the step of establishing a billing agreement the third party does not approve an agreement between the purchasing customer and the selling vendor to enter into the purchase transaction.

58. The method according to claim 26, wherein after the step of establishing a billing agreement the third party does not approve an agreement between the purchasing customer and the selling vendor to enter into the purchase transaction.

59. The method according to claim 27, wherein after the step of establishing a billing agreement the third party does not approve an agreement between the purchasing customer and the selling vendor to enter into the purchase transaction.

60. The method according to claim 28, wherein after the step of establishing a billing agreement the third party does not approve an agreement between the purchasing customer and the selling vendor to enter into the purchase transaction.

61. The method according to claim 29, wherein after the step of establishing a billing agreement the third party does not approve an agreement between the purchasing customer and the selling vendor to enter into the purchase transaction.

62. The method according to claim 30, wherein after the step of establishing a billing agreement the third party does not approve an agreement between the purchasing customer and the selling vendor to enter into the purchase transaction.

63. The method according to claim 31, wherein after the step of establishing a billing agreement the third party does not approve an agreement between the purchasing customer and the selling vendor to enter into the purchase transaction.

64. The method according to claim 32, wherein after the step of establishing a billing agreement the third party does not approve an agreement between the purchasing customer and the selling vendor to enter into the purchase transaction.

65. The method according to claim 33, wherein after the step of establishing a billing agreement the third party does not approve an agreement between the purchasing customer and the selling vendor to enter into the purchase transaction.

66. The method according to claim 34, wherein after the step of establishing a billing agreement the third party does not approve an agreement between the purchasing customer and the selling vendor to enter into the purchase transaction.

67. An Internet billing method for a plurality of customers and a plurality of vendors of products or services for transactions over the Internet between a purchasing customer of the plurality of customers and a selling vendor of the plurality of vendors, wherein, for each purchase transaction of a product or service between the purchasing customer and the selling vendor, a first amount is charged to the purchasing customer and a second amount is remitted to the selling vendor, the method comprising the steps by a third party to the purchase transaction of:
   a) establishing a billing agreement with the purchasing customer to permit the third party to charge the purchasing customer and to remit to a selling vendor for a purchase transaction;
   b) establishing a remitting agreement with the selling vendor to permit the third party to charge a purchasing customer and to remit to the selling vendor for a purchase transaction;
   c) providing a communications link through equipment of the third party between the purchasing customer and the selling vendor to permit the purchasing customer to communicate over the Internet with the selling vendor concerning the purchase transaction.
   d) receiving authorization over the Internet from the purchasing customer to charge the first amount to the purchasing customer without previously receiving a request from the selling vendor to charge the first amount to the purchasing customer, wherein receiving authorization is performed after the purchasing customer and the selling vendor have agreed to enter into the purchase transaction;
   e) charging the first amount to the purchasing customer in accordance with the billing agreement; and
   f) remitting the second amount to the selling vendor in accordance with the remitting agreement.

68. The method according to claim 67, wherein no credit card account number of the purchasing customer and no bank account number of the purchasing customer is transmitted over the Internet by the third party to the selling vendor prior to the step of remitting.

69. An Internet billing method for a plurality of customers and a plurality of vendors of products or services for transactions over the Internet between a purchasing customer of the plurality of customers and a selling vendor of the plurality of vendors, wherein, for each purchase transaction of a product or service between the purchasing customer and the selling vendor, a first amount is charged to the purchasing customer and a second amount is remitted to the selling vendor, the method comprising the steps by a third party to the purchase transaction of:
   a) establishing a billing agreement with the purchasing customer to permit the third party to charge the purchasing customer and to remit to a selling vendor for a purchase transaction;
   b) establishing a remitting agreement with the selling vendor to permit the third party to charge a purchasing customer and to remit to the selling vendor for a purchase transaction, wherein the remitting agreement does not require the third party to charge the purchasing customer;
   c) providing a communications link through equipment of the third party between the purchasing customer and the selling vendor to permit the purchasing customer to communicate over the Internet with the selling vendor concerning the purchase transaction;
   d) receiving authorization over the Internet from the purchasing customer to charge the first amount to the purchasing customer without previously receiving a request from the selling vendor to charge the first amount to the purchasing customer;

e) charging the first amount to the purchasing customer in accordance with the billing agreement; and f) remitting the second amount to the selling vendor in accordance with the remitting agreement.

70. The method according to claim 69, wherein no credit card account number of the purchasing customer and no bank account number of the purchasing customer is transmitted over the Internet by to third party to the selling vendor prior to the step of remitting.

71. An Internet billing method for a plurality of customers and a plurality of vendors of products or services for transactions over the Internet between a purchasing customer of the plurality of customers and a selling vendor of the plurality of vendors, wherein, for each purchase transaction of a product or service between the purchasing customer and the selling vendor, a first amount is charged to the purchasing customer and a second amount is remitted to the selling vendor, the method comprising the steps by a third patty to the purchase transaction of:

a) establishing a billing agreement with the purchasing customer to permit the third party to charge the purchasing customer and to remit to a selling vendor for a purchase transaction;

b) establishing a remitting agreement with the selling vendor to permit the third party to charge a purchasing customer and to remit to the selling vendor for a purchase transaction;

c) providing a communications link through equipment of the third party between the purchasing customer and the selling vendor to permit the purchasing customer to communicate over the Internet with the selling vendor concerning the purchase transaction;

d) receiving authorization over the Internet from the purchasing customer to charge the first amount to the purchasing customer without previously receiving a request from the selling vendor to charge the first amount to the purchasing customer;

e) charging the first amount to the purchasing customer in accordance with the billing agreement; and f) remitting the second amount to the selling vendor in accordance with the remitting agreement; and wherein after establishing the billing agreement the third party does not approve an agreement between the purchasing customer and the selling vendor to enter into the purchase transaction.

72. The method according to claim 71, wherein no credit card account number of the purchasing customer and no bank account number of the purchasing customer is transmitted over the Internet by the third party to the selling vendor prior to the step of remitting.

73. An Internet billing method for a plurality of customers and a plurality of vendors of products or services for transactions over the Internet between a purchasing customer of the plurality of customers and a selling vendor of the plurality of vendors, wherein, for each purchase transaction of a product or service between the purchasing customer and the selling vendor a first amount is charged to the purchasing customer and a second amount is remitted to the selling vendor, the method comprising the steps by a third party to the purchase transaction of:

a) establishing a billing agreement with the purchasing customer to permit the third party to charge the purchasing customer and to remit to a selling vendor for a purchase transaction;

b) establishing a remitting agreement with the selling vendor to permit the third party to charge a purchasing customer and to remit to the selling vendor for a purchase transaction, wherein the remitting agreement does not require the third party to charge the purchasing customer;

c) providing a communications link through equipment of the third party between the purchasing customer and the selling vendor to permit the purchasing customer to communicate over the Internet with the selling vendor concerning the purchase transaction;

d) receiving authorization over the Internet from the purchasing customer to charge the first amount to the purchasing customer without previously receiving a request from the selling vendor to charge the first amount to the purchasing customer, wherein receiving authorization is performed after the purchasing customer and the selling vendor have agreed to enter into the purchase transaction;

e) charging the first amount to the purchasing customer in accordance with the billing agreement; and f) remitting the second amount to the selling vendor in accordance with the remitting agreement.

74. The method according to claim 73, wherein no credit card account number of the purchasing customer and no bank account number of the purchasing customer is transmitted over the Internet by the third party to the selling vendor prior to the step of remitting.

75. An Internet billing method for a plurality of customers and a plurality of vendors of products or services for transactions over the Internet between a purchasing customer of the plurality of customers and a selling vendor of the plurality of vendors, wherein, for each purchase transaction of a product or service between the purchasing customer and the selling vendor, a first amount is charged to the purchasing customer and a second amount is remitted to the selling vendor, the method comprising the steps by a third party to the purchase transaction of:

a) establishing a billing agreement with the purchasing customer to permit the third party to charge the purchasing customer and to remit to a selling vendor for a purchase transaction;

b) establishing a remitting agreement with the selling vendor to permit the third party to charge a purchasing customer and to remit to the selling vendor for a purchase transaction;

c) providing a communications link through equipment of the third party between the purchasing customer and the selling vendor to permit the purchasing customer to communicate over the Internet with the selling vendor concerning the purchase transaction;

d) receiving authorization over the Internet from the purchasing customer to charge the first amount to the purchasing customer without previously receiving a request from the selling vendor to charge the first amount to the purchasing customer, wherein receiving authorization is performed after the purchasing customer and the selling vendor have agreed to enter into the purchase transaction;

e) charging the first amount to the purchasing customer in accordance with the billing agreement; and f) remitting the second amount to the selling vendor in accordance with the remitting agreement.

wherein after establishing the billing agreement the third party does not approve an agreement between the purchasing customer and the selling vendor to enter into the purchase transaction.

76. The method according to claim 75, wherein no credit card account number of the purchasing customer and no bank account number of the purchasing customer is transmitted over the Internet by the third party to the selling vendor prior to the step of remitting.

77. An Internet billing method for a plurality of customers and a plurality of vendors of products or services for transactions over the Internet between a purchasing customer of the plurality of customers and a selling vendor of the plurality of vendors, wherein, for each purchase transaction of a product or service between the purchasing customer and the selling vendor, a first amount is charged to the purchasing customer and a second amount is remitted to the selling vendor, the method comprising the steps by a third party to the purchase transaction of:

a) establishing a billing agreement with the purchasing customer to permit the third party to charge the purchasing customer and to remit to a selling vendor for a purchase transaction;

b) establishing a remitting agreement with the selling vendor to permit the third party to charge a purchasing customer and to remit to the selling vendor for a purchase transaction, wherein the remitting agreement does not require the third party to charge the purchasing customer;

c) providing a communications link through equipment of the third party between the purchasing customer and the selling vendor to permit the purchasing customer to communicate over the Internet with the selling vendor concerning the purchase transaction;

d) receiving authorization over the Internet from the purchasing customer to charge the first amount to the purchasing customer without previously receiving a request from the selling vendor to charge the first amount to the purchasing customer;

e) charging the first amount to the purchasing customer in accordance with the billing agreement; and f) remitting the second amount to the selling vendor in accordance with the remitting agreement, wherein after establishing the billing agreement the third party does not approve an agreement between the purchasing customer and the selling vendor to enter into the purchase transaction.

78. The method according to claim 77, wherein no credit card account number of the purchasing customer and no bank account number of the purchasing customer is transmitted over the Internet by the third party to the selling vendor prior to the step of remitting.

79. An Internet billing method for a plurality of customers and a plurality of vendors of products or services for transactions over the Internet between a purchasing customer of the plurality of customers and a selling vendor of the plurality of vendors, wherein, for each purchase transaction of a product or service between the purchasing customer and the selling vendor, a first amount is charged to the purchasing customer and a second amount is remitted, to the selling vendor, the method comprising the steps by a third party to the purchase transaction of:

a) establishing a billing agreement with the purchasing customer to permit the third party to charge the purchasing customer and to remit to a selling vendor for a purchase transaction;

b) establishing a remitting agreement with the selling vendor to permit the third party to charge a purchasing customer and to remit to the selling vendor for a purchase transaction, wherein the remitting agreement does not require the third party to charge the purchasing customer;

c) providing a communications link through equipment of the third party between the purchasing customer and the selling vendor to permit the purchasing customer to communicate over the Internet with the selling vendor concerning the purchase transaction;

d) receiving authorization over the Internet from the purchasing customer to charge the first amount to the purchasing customer without previously receiving a request from the selling vendor to charge the first amount to the purchasing customer, wherein receiving authorization is performed after the purchasing customer and the selling vendor have to enter into the purchase transaction;

e) charging the first amount to the purchasing customer in accordance with the billing agreement; and f) remitting the second amount to the selling vendor in accordance with the remitting agreement, wherein after establishing the billing agreement the third party does not approve an agreement between the purchasing customer and the selling vendor to enter into the purchase transaction.

80. The method according to claim 79, wherein no credit card account number of the purchasing customer and no bank account number of the purchasing customer is transmitted over the Internet by the third party to the selling vendor prior to the step of remitting.

81. The method according to any one of claims 67, 68, 69, 70, 71, 72, 73, 74, 75, 76, 77, 78, 79, and 80, wherein the third party is a cable television company, a company offering financial services, an Internet access provider, or a telephone company.

82. The method according to claim 81, further comprising the step of obtaining approval for charging the first amount from a party other than the purchasing customer and the selling vendor prior to the step of charging.

83. The method according to claim 82, wherein the party other tan the purchasing customer and the selling vendor is a bank, a company offering financial services, a credit card company, an Internet access provider, or the third party.

84. The method according to claim 81, wherein the step of charging comprises sending a bill or charging an account with a bank, a cable television company, a company offering financial services, a credit card company, an Internet access provider, a telephone company, or the third party.

85. The method according to claim 81, wherein the step of remitting comprises sending a check or crediting an account with a bank, a cable television company, a company offering financial services, a credit card company, an Internet access provider, a telephone company, or the third party.

86. The method according to claim 81, wherein the second amount is less than the first amount.

87. The method according to claim 81, wherein the step of remitting is performed before the step of charging.

88. An Internet billing method for a plurality of customers and a plurality of vendors of products or services for transactions over the Internet between a purchasing customer of the plurality of customers and a selling vendor of the plurality of vendors, wherein, for each purchase transaction of a product or service between the purchasing customer and the selling vendor, a first amount is charged to the purchasing customer and a second amount is remitted to the selling vendor, the method comprising the steps by a third party company offering financial services of:

a) establishing a billing agreement with the purchasing customer to permit the company offering financial services to charge the purchasing customer and to remit to a selling vendor for a purchase transaction;

b) establishing a remitting agreement with the selling vendor to permit the company offering financial services to charge a purchasing customer and to remit to the selling vendor for a purchase transaction;

c) providing a communications link through equipment of the third party between the purchasing customer and the selling vendor to permit the purchasing customer to communicate over the Internet with the selling vendor concerning the purchase transaction;

d) receiving authorization over the Internet from the purchasing customer to charge the first amount to the purchasing customer without previously receiving a request from the selling vendor to charge the first amount to the purchasing customer, wherein receiving authorization is performed after the purchasing customer and the selling vendor have to enter into the purchase transaction;

e) charging the first amount to the purchasing customer in accordance with the billing agreement by charging a bank account, a credit card account, or an account with the company offering financial services; and f) remitting the second amount to the selling vendor in accordance with the remitting agreement without previously transmitting a credit card account number of the purchasing customer over the Internet to the selling vendor and without previously transmitting a bank account number of the purchasing customer over the Internet to selling vendor.

89. An Internet billing method for a plurality of customers and a plurality of vendors of products or services for transactions over the Internet between a purchasing customer of the plurality of customers and a selling vendor of the plurality of vendors, wherein, for each purchase transaction of a product or service between the purchasing customer and the selling vendor, a first amount is charged to the purchasing customer and a second amount is remitted to the selling vendor, the method comprising the steps by a third party company offering financial services of:

a) establishing a billing agreement with the purchasing customer to permit the company offering financial services to charge the purchasing customer and to remit to a selling vendor for a purchase transaction;

b) establishing a remitting agreement with the selling vendor to permit the company offering financial services to charge a purchasing customer and to remit to the selling vendor for a purchase transaction, wherein the remitting agreement does not require the company offering financial services to charge the purchasing customer;

c) providing a communications link through equipment of the third party between the purchasing customer and the selling vendor to permit the purchasing customer to communicate over the Internet with the selling vendor concerning the purchase transaction;

d) receiving authorization over the Internet from the purchasing customer to charge the first amount to the purchasing customer without previously receiving a request from the selling vendor to charge the first amount to the purchasing customer;

e) charging the first amount to the purchasing customer in accordance with the billing agreement by charging a bank account, a credit card account, or an account with the company offering financial services; and f) remitting the second amount to the selling vendor in accordance with the remitting agreement without previously transmitting a credit card account number of the purchasing customer over the Internet to the selling vendor and without previously transmitting a bank account number of the purchasing customer over the Internet to the selling vendor.

90. An Internet billing method for a plurality of customers and a plurality of vendors of products or services for transactions over the Internet between a purchasing customer of the plurality of customers and a selling vendor of the plurality of vendors, wherein, for each purchase transaction of a product or service between the purchasing customer and the selling vendor, a first amount is charged to the purchasing customer and a second amount is remitted to the selling vendor, the method comprising the steps by a third party company offering financial services of:

a) establishing a billing agreement with the purchasing customer to permit the company offering financial services to charge the purchasing customer and to remit to a selling vendor for a purchase transaction;

b) establishing a remitting agreement with the selling vendor to permit the company offering financial services to charge a purchasing customer and to remit to the selling vendor for a purchase transaction, c) providing a communications link through equipment of the third party between the purchasing customer and the selling vendor to permit the purchasing customer to communicate over the Internet with the selling vendor concerning the purchase transaction;

d) receiving authorization over the Internet from the purchasing customer to charge the first amount to the purchasing customer without previously receiving a request from the selling vendor to charge the first amount to the purchasing customer;

e) charging the first amount to the purchasing customer in accordance with the billing agreement by charging a bank account, a credit card account, or an account with the company offering financial services; and f) remitting the second amount to the selling vendor in accordance with the remitting agreement without previously transmitting a credit card account number of the purchasing customer over the Internet to the selling vendor and without previously transmitting a bank account number of the purchasing customer over the Internet to the selling vendor, wherein after establishing the billing agreement the company offering financial services does not approve an agreement between the purchasing customer and the selling vendor to enter into the purchase transaction.

91. An Internet billing method for a plurality of customers and a plurality of vendors of products or services for transactions over the Internet between a purchasing customer of the plurality of customers and a selling vendor of the plurality of vendors, wherein, for each purchase transaction of a product or service between the purchasing customer and the selling vendor, a first amount is charged to the purchasing customer and a second amount is remitted to the selling vendor, the method comprising the steps by a third party company offering financial services of:

a) establishing a billing agreement with the purchasing customer to permit the company offering financial services to charge the purchasing customer and to remit to a selling vendor for a purchase transaction;

b) establishing a remitting agreement with the selling vendor to permit the company offering financial services to charge a purchasing customer and to remit to the selling vendor for a purchase transaction, wherein the remitting agreement does not require the company offering financial services to charge the purchasing customer;

c) providing a communications link through equipment of the third party between the purchasing customer and the selling vendor to permit the purchasing customer to communicate over the Internet with the selling vendor concerning the purchase transaction;

d) receiving authorization over the Internet from the purchasing customer to charge the first amount to the purchasing customer without previously receiving a request from the selling vendor to charge the first amount to the purchasing customer, wherein receiving authorization is performed after the purchasing customer and the selling vendor have to enter into the purchase transaction;

e) charging the first amount to the purchasing customer in accordance with the billing agreement by charging a bank account, a credit card account, or an account with the company offering financial services; and f) remitting the second amount to the selling vendor in accordance with the remitting agreement without previously transmitting a credit card account number of the purchasing customer over the Internet to the selling vendor and without previously transmitting a bank account number of the purchasing customer over the Internet to the selling vendor.

92. An Internet billing method for a plurality of customers and a plurality of vendors of products or services for transactions over the Internet between a purchasing customer of the plurality of customers and a selling vendor of the plurality of vendors, wherein, for each purchase transaction of a product or service between the purchasing customer and the selling vendor, a first amount is charged to the purchasing customer and a second amount is remitted to the selling vendor, the method comprising the steps by a third party company offering financial services of:

a) establishing a billing agreement with the purchasing customer to permit the company offering financial services to charge the purchasing customer and to remit to a selling vendor for a purchase transaction;

b) establishing a remitting agreement with the selling vendor to permit the company offering financial services to charge a purchasing customer and to remit to the selling vendor for a purchase transaction;

c) providing a communications link through equipment of the third party between the purchasing customer and the selling vendor to permit the purchasing customer to communicate over the Internet with the selling vendor concerning the purchase transaction;

d) receiving authorization over the Internet from the purchasing customer to charge the first amount to the purchasing customer without previously receiving a request from the selling vendor to charge the first amount to the purchasing customer, wherein receiving authorization is performed after the purchasing customer and the selling vendor have to enter into the purchase transaction;

e) charging the first amount to the purchasing customer in accordance with the billing agreement by charging a bank account, a credit card account, or an account with the company offering financial services; and f) remitting the second amount to the selling vendor in accordance with the remitting agreement without previously transmitting a credit card account number of the purchasing customer over the Internet to the selling vendor and without previously transmitting a bank account number of the purchasing customer over the Internet to the selling vendor, wherein alter establishing the billing agreement the company offering financial services does not approve an agreement between the purchasing customer and the selling vendor to enter into the purchase transaction.

93. An Internet billing method for a plurality of customers and a plurality of vendors of products or services for transaction over the Internet between a purchasing customer of the plurality of customers and a selling vendor of the plurality of vendors, wherein, for each purchase transaction of a product or service between the purchasing customer and the selling vendor, a first amount is charged to the purchasing customer and a second amount is remitted to the selling vendor, the method comprising the steps by a third party company offering financial services of:

a) establishing a billing agreement with the purchasing customer to permit the company offering financial services to charge the purchasing customer and to remit to a selling vendor for a purchase transaction;

b) establishing a remitting agreement with the selling vendor to permit the company offering financial services to charge a purchasing customer and to remit to the selling vendor for a purchase transaction, wherein the remitting agreement does not require the company offering financial services to charge the purchasing customer;

c) providing a communications link through equipment of the third party between the purchasing customer and the selling vendor to permit the purchasing customer to communicate over the Internet with the selling vendor concerning the purchase transaction;

d) receiving authorization over the Internet from the purchasing customer to charge the first amount to the purchasing customer without previously receiving a request from the selling vendor to charge the first amount to the purchasing customer;

e) charging the first amount to the purchasing customer in accordance with the billing agreement by charging a bank account, a credit card account, or an account with the company offering financial services; and f) remitting the second amount to the selling vendor in accordance with the remitting agreement without previously transmitting a credit card account number of the purchasing customer over the Internet to the selling vendor and without previously transmitting a bank account number of the purchasing customer over the Internet to the selling vendor, wherein alter establishing the billing agreement the company offering financial services does not approve an agreement between the purchasing customer and the selling vendor to enter into the purchase transaction.

94. An Internet billing method for a plurality of customers and a plurality of vendors of products or services for transactions over the Internet between a purchasing customer of the plurality of customers and a selling vendor of the plurality of vendors, wherein, for each purchase transaction of a product or service between the purchasing customer and the selling vendor, a first amount is charged to the purchasing customer and a second amount is remitted to the selling vendor, the method comprising the steps by a third party company offering financial services of:

a) establishing a billing agreement with the purchasing customer to permit the company offering financial services to charge the purchasing customer and to remit to a selling vendor for a purchase transaction;

b) establishing a remitting agreement with the selling vendor to permit the company offering financial services to charge a purchasing customer and to remit to the selling vendor for a purchase transaction; wherein the remitting agreement does not require the company offering financial services to charge the purchasing customer;

c) providing a communications link through equipment of the third party between the purchasing customer and the selling vendor to permit the purchasing customer to communicate over the Internet with the selling vendor concerning the purchase transaction;

d) receiving authorization over the Internet from the purchasing customer to charge the first amount to the purchasing customer without previously receiving a request from the selling vendor to charge the first amount to the purchasing customer, wherein receiving authorization is performed after the purchasing customer and the selling vendor have to enter into the purchase transaction;

e) charging the first amount to the purchasing customer in accordance with the billing agreement by charging a bank account, a credit card account, or an account with the company offering financial services; and f) remitting the second amount to the selling vendor in accordance with the remitting agreement without previously transmitting a credit card account number of the purchasing customer over the Internet to the selling vendor and without previously transmitting a bank account number of the purchasing customer over the Internet to the selling vendor, wherein alter establishing the billing agreement the company offering financial services does not approve an agreement between the purchasing customer and the selling vendor to enter into the purchase transaction.

* * * * *

UNITED STATES PATENT AND TRADEMARK OFFICE
CERTIFICATE OF CORRECTION

PATENT NO. : 6,976,008 B2
DATED : December 13, 2005
INVENTOR(S) : Egendorf

It is certified that error appears in the above-identified patent and that said Letters Patent is hereby corrected as shown below:

Title page showing an illustrative figure, should be deleted and substitute the attached title page.

<u>Title page,</u>
Item [56], References Cited, U.S. PATENT DOCUMENTS, add the following:

| | | | |
|---|---|---|---|
| -- 3,652,795 | 3/1972 | Wolf et al. | 379/91.01 |
| 5,146,491 | 9/1992 | Silver et al. | 379/114.24 |
| 5,283,731 | 2/1994 | Lalonde et al. | 705/1 |
| 5,446,489 | 8/1995 | Egendorf | 725/1 |
| 5,590,197 | 12/1996 | Chen et al. | 705/65 |
| 5,724,424 | 3/1998 | Gifford | 705/79 |
| 5,727,163 | 3/1998 | Bezos | 705/27 |
| 5,819,092 | 10/1998 | Ferguson et al. | 717/1 |
| 5,826,241 | 10/1998 | Stein et al. | 705/26 --. |

FOREIGN PATENT DOCUMENTS, add the following:

| | | |
|---|---|---|
| -- 97/41586 | 11/6/97 | WO |
| 05-014510 | 1/22/93 | Japan |
| 06-291889 | 10/18/94 | Japan |
| 07-056888 | 3/3/95 | Japan --. |

OTHER PUBLICATIONS, add the following:

-- Paul, Nora. "Database and Bulletin Board Services: A Guide to On-Line Resources". The Quill, vol. 81, no. 7, p. 18. September, 1993.

Bremner, Joseph. "Guide to Database Distribution: Legal Aspects and Model Contracts, Second Edition". National Federation of Abstracting and Information Services, chapters 3, 4, and 6. 1994.

"New Line for SBA". Family and Home Office Computing, vol. 12, no. 4, p. 19. April, 1994.

Blankenhorn, Dana. "Virtual Mall Opens in Cyberspace. Newsbytes. June 20, 1994.

Goradia et al. "NetBill 1994 Prototype". Carnegie Mellon University Information Networking Institute. August, 1994.

Meece, Mickey. "Start-Up Offers Payment System for Data Bought Over Internet". American Banker, vol. 159, no. 203, p. 1. Oct. 20, 1994.

UNITED STATES PATENT AND TRADEMARK OFFICE
CERTIFICATE OF CORRECTION

PATENT NO.    : 6,976,008 B2
DATED         : December 13, 2005
INVENTOR(S)   : Egendorf It is certified that error appears in the above-identified patent and that said Letters Patent is hereby corrected as shown below:

Title page (cont'd),

Rodriguez, Karen. "Cyberspace Start-Ups Offer Internet Wares". InfoWorld, vol. 16, no. 43, p. 8. Oct. 24, 1994.

"First Virtual Bank of Cyberspace". Newsbytes News Network. October 28, 1994.

Press, Larry. "Commercialization of the Internet". Communications of the ACM, vol. 37, no. 10, p. 17. November, 1994.

Wiegers, Alex. "First Virtual Really Pays Bills". Business Journal, vol. 12, no. 40, p. 1. December 26, 1994.

Cummings, Joanne, and Knight, Fred. "Internet Service Providers to Ride a Familiar Roller Coaster". Business Communications Review, vol. 25, no. 1, p. 67. January, 1995.

Day, Jacqueline. "Industry Players in Hot Pursuit of Secure Internet Transaction Mode". Bank Systems & Technology, vol 32, no. 1. January, 1995.
Into the Cyberspace". Credit Card Management, vol. 7, no. 11, p. 34. February, 1995.

Blankenhorn, Dana. "Building the Tools for Web Commerce". Interactive Age, vol. 2, no. 8, p. 34. February 13, 1995.

Knowles, Anne. "Improved Internet Security Enabling On-Line Commerce (new services based on Secure Hypertext Transfer Protocol, Secure Sockets Layer Standards)". PC Week, vol. 12, no. 11, p. 1. March 20, 1995.

Marrinan, Michele. "First Union, Open Market Hit the Internet". Bank Systems + Technology, vol. 32, no. 5, p. 6. May, 1995.

Singleton, Andrew. "Cash on the Wirehead: You Can't Do Business on the Internet If You Can't Pay Your Bills or Get Paid. Here's How". Byte, vol. 20, no. 6, p. 71. June, 1995.

Bowers, Richard. "First Virtual Offers Unique Internet Payment System". Newsbytes News Network, p. 1. June 23, 1995.

Bowers, Richard. "First Virtual Creates Corporation of Future". Newsbytes News Network, p. 1. June 28, 1995. --.

Column 1,
Line 31, "nave" should read -- have --.

Column 2,
Line 12, "exxisting" should read -- existing --.
Lines 29 and 37, "vender," should read -- vendor, --.
Lines 50-51, "offer customers" should read -- offer their customers --.
Line 56, "chance" should read -- change --.

UNITED STATES PATENT AND TRADEMARK OFFICE
CERTIFICATE OF CORRECTION

PATENT NO. : 6,976,008 B2
DATED : December 13, 2005
INVENTOR(S) : Egendorf

It is certified that error appears in the above-identified patent and that said Letters Patent is hereby corrected as shown below:

Column 3,
Line 29, "agrees to the" should read -- agrees to do the --.
Line 35, "vender's" should read -- vendor's --.
Line 53, "or example," should read -- for example, --.
Line 54, "or o a" should read -- or to a --.
Line 63, "provider, to the" should read -- provider, not the --.

Column 4,
Line 6, "make" should read -- made --.
Line 55, "providers" should read -- provides --.
Line 57, "Access network, an" should read -- Access network 3 can be a telephone network, a cable television network, an --.
Line 58, "Prodigy, r a" should read -- Prodigy, or a --.
Line 66, "agreement" should read -- agreements --.

Column 5,
Line 25, "form" should read -- from --.
Line 40, "from the vendor" should read -- from the exchange of information taking place between the customer and the vendor --.
Line 50, "Provider then" should read -- Provider 2 then --.
Line 61, "4.1-4.$n$and" should read -- 4.1-4.$n$ and --.
Line 65, "customer" should read -- customers --.
Line 66, "is" should read -- in --.

Column 6,
Line 1, "services" should read -- service --.
Lines 7 and 14, "form" should read -- from --.
Line 26, "sued" should read -- used --.
Line 39, "VISA, Mastercard" should read -- VISA or Mastercard --.
Line 44, "is, t can" should read -- is, it can --.
Line 57, "or a" should read -- or an --.
Line 63, "For" should read -- for --.

Column 7,
Line 8, "amount" should read -- account --.
Line 9, "with the third" should read -- with a third --.
Line 62, "on Internet" should read -- an Internet --.

UNITED STATES PATENT AND TRADEMARK OFFICE
CERTIFICATE OF CORRECTION

PATENT NO. : 6,976,008 B2
DATED : December 13, 2005
INVENTOR(S) : Egendorf

It is certified that error appears in the above-identified patent and that said Letters Patent is hereby corrected as shown below:

Column 8,
Line 8, "company an" should read -- company, an --.
Line 61, "preformed" should read -- performed --.

Column 9,
Line 3, "arced" should read -- agreed --.
Line 34, "patty" should read -- party --.

Column 12,
Line 23, "transaction." should read -- transaction; --.

Column 13,
Line 11, "by to" should read -- by the --.
Line 22, "patty" should read -- party --.
Line 45, "agreement; and" should read -- agreement, --.
Line 61, "vendor a" should read -- vendor, a --.

Column 14,
Line 67, "agreement." should read -- agreement, --.

Column 15,
Line 61, "remitted, to" should read -- remitted to --.
Line 18, "have to" should read -- have agreed to --.

Column 16,
Line 44, "tan" should read -- than --.
Line 23, "have to" should read -- have agreed to --.
Line 35, "to selling" should read -- to the selling --.

Column 18,
Line 29, "transaction," should read -- transaction; --.
Line 21, "have to" should read -- have agreed to --.

Column 19,
Line 64, "have to" should read -- have agreed to --.
Line 10, "alter" should read -- after --.

Column 20,
Line 16, "transaction over" should read -- transactions over --.
Line 57, "alter" should read -- after --.

UNITED STATES PATENT AND TRADEMARK OFFICE
CERTIFICATE OF CORRECTION

PATENT NO.    : 6,976,008 B2
DATED         : December 13, 2005
INVENTOR(S)   : Egendorf It is certified that error appears in the above-identified patent and that said Letters Patent is hereby corrected as shown below:

Column 21,
Line 19, "transaction;" should read -- transaction, --.

Column 22,
Line 4, "have to" should read -- have agreed to --.
Line 17, "alter" should read -- after --.

Signed and Sealed this

Ninth Day of May, 2006

JON W. DUDAS
*Director of the United States Patent and Trademark Office*

(12) United States Patent
Egendorf

(10) Patent No.: US 6,976,008 B2
(45) Date of Patent: *Dec. 13, 2005

(54) INTERNET BILLING METHOD

(75) Inventor: Andrew Egendorf, Lincoln, MA (US)

(73) Assignee: Netcraft, Corporation, Lincoln, MA (US)

( * ) Notice: Subject to any disclaimer, the term of this patent is extended or adjusted under 35 U.S.C. 154(b) by 290 days.

This patent is subject to a terminal disclaimer.

(21) Appl. No.: 09/975,839

(22) Filed: Oct. 11, 2001

(65) Prior Publication Data

US 2002/0032654 A1 Mar. 14, 2002

Related U.S. Application Data

(63) Continuation of application No. 09/568,925, filed on May 11, 2000, which is a continuation of application No. 09/057,230, filed on Apr. 8, 1998, now Pat. No. 6,188,994, which is a continuation of application No. 08/499,535, filed on Jul. 7, 1995, now Pat. No. 5,794,221.

(51) Int. Cl.$^7$ .............................................. G06F 17/60
(52) U.S. Cl. ........................ 705/40; 705/41; 705/42
(58) Field of Search ............................. 705/40, 41, 42

(56) References Cited

U.S. PATENT DOCUMENTS

| | | | | |
|---|---|---|---|---|
| 3,573,747 A | * | 4/1971 | Adams ..................... | 340/172.5 |
| 5,146,491 A | * | 9/1992 | Silver et al. .............. | 379/114 |
| 5,329,589 A | * | 7/1994 | Fraser et al. ............. | 379/91.02 |
| 5,394,324 A | * | 2/1995 | Clearwater ............... | 705/8 |
| 5,446,489 A | * | 8/1995 | Egendorf ................. | 348/3 |
| 5,737,414 A | | 4/1998 | Walker et al. ........... | 380/4 |
| 5,845,265 A | | 12/1998 | Woolston ................. | 705/37 |

OTHER PUBLICATIONS

Carnegie Mellon University, "Internet billing Server Prototype Scope Document INI Techinical Report 1993–1" (Oct. 14, 1993).*

* cited by examiner

*Primary Examiner*—V. Millin
*Assistant Examiner*—Daniel S. Felten
(74) *Attorney, Agent, or Firm*—Hogan & Hartson L.L.P.

(57) ABSTRACT

An Internet billing method comprises establishing an agreement between an Internet access provider and a customer, and an agreement between the Internet access provider and a vendor, wherein the Internet access provider agrees with the customer and the vendor to bill the customer and remit to the vendor for products and services purchased over the Internet by the customer from the vendor. The provider creates access to the Internet for the customer. When the customer orders a product or service over the Internet from a vendor, transactional information transmitted between the customer and the vendor is also transmitted to the provider. The provider then bills the transaction amount to the customer and remits a portion of the transaction amount to the vendor, keeping the differential as a fee for providing the service. As a result of this method, there is no need for any customer account numbers or vendor account numbers to be transmitted over the Internet, thereby maintaining the security of that information.

94 Claims, 3 Drawing Sheets

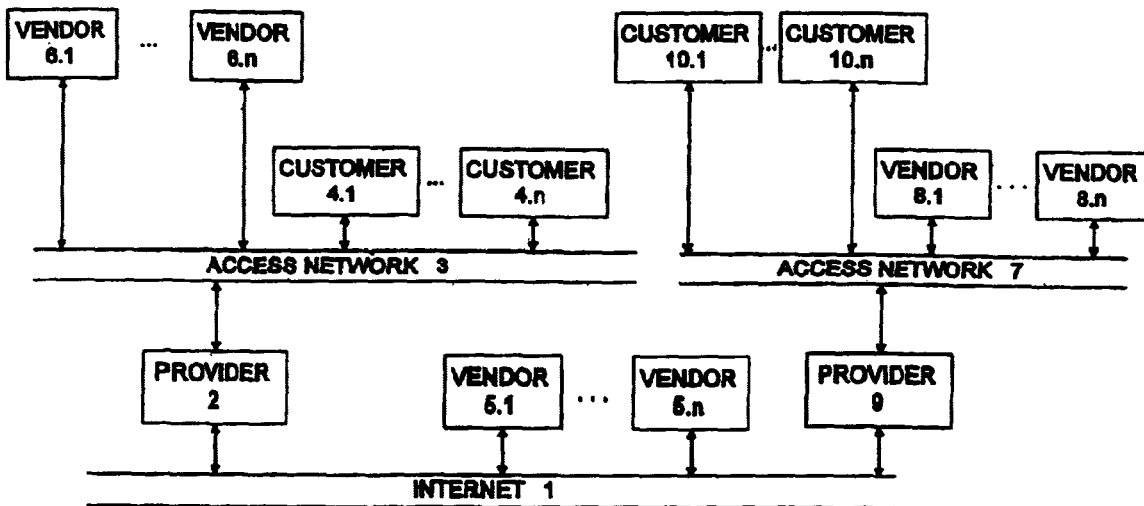

UNITED STATES PATENT AND TRADEMARK OFFICE
CERTIFICATE OF CORRECTION

| | | |
|---|---|---|
| PATENT NO. | : 6,976,008 B2 | Page 1 of 9 |
| APPLICATION NO. | : 09/975839 | |
| DATED | : December 13, 2005 | |
| INVENTOR(S) | : Egendorf | |

It is certified that error appears in the above-identified patent and that said Letters Patent is hereby corrected as shown below:

Title page showing an illustrative figure, should be deleted and substitute the attached title page.

Title page,
Item [56], References Cited, U.S. PATENT DOCUMENTS, add the following:

| | | | |
|---|---|---|---|
| -- 3,652,795 | 3/1972 | Wolf et al. | 379/91.01 |
| 5,146,491 | 9/1992 | Silver et al. | 379/114.24 |
| 5,283,731 | 2/1994 | Lalonde et al. | 705/1 |
| 5,446,489 | 8/1995 | Egendorf | 725/1 |
| 5,590,197 | 12/1996 | Chen et al. | 705/65 |
| 5,724,424 | 3/1998 | Gifford | 705/79 |
| 5,727,163 | 3/1998 | Bezos | 705/27 |
| 5,819,092 | 10/1998 | Ferguson et al. | 717/1 |
| 5,826,241 | 10/1998 | Stein et al. | 705/26 --. |

FOREIGN PATENT DOCUMENTS, add the following:

| | | |
|---|---|---|
| -- 97/41586 | 11/6/97 | WO |
| 05-014510 | 1/22/93 | Japan |
| 06-291889 | 10/18/94 | Japan |
| 07-056888 | 3/3/95 | Japan --. |

OTHER PUBLICATIONS, add the following:

-- Paul, Nora. "Database and Bulletin Board Services: A Guide to On-Line Resources". The Quill, vol. 81, no. 7, p. 18. September, 1993.

Bremner, Joseph. "Guide to Database Distribution: Legal Aspects and Model Contracts, Second Edition". National Federation of Abstracting and Information Services, chapters 3, 4, and 6. 1994.

"New Line for SBA". Family and Home Office Computing, vol. 12, no. 4, p. 19. April, 1994.

Blankenhorn, Dana. "Virtual Mall Opens in Cyberspace. Newsbytes. June 20, 1994.

Goradia et al. "NetBill 1994 Prototype". Carnegie Mellon University Information Networking Institute. August, 1994.

Meece, Mickey. "Start-Up Offers Payment System for Data Bought Over Internet". American Banker, vol. 159, no. 203, p. 1. Oct. 20, 1994.

UNITED STATES PATENT AND TRADEMARK OFFICE
CERTIFICATE OF CORRECTION

PATENT NO. : 6,976,008 B2
APPLICATION NO. : 09/975839
DATED : December 13, 2005
INVENTOR(S) : Egendorf It is certified that error appears in the above-identified patent and that said Letters Patent is hereby corrected as shown below:

Title page (cont'd),

Rodriguez, Karen. "Cyberspace Start-Ups Offer Internet Wares". InfoWorld, vol. 16, no. 43, p. 8. Oct. 24, 1994.

"First Virtual Bank of Cyberspace". Newsbytes News Network. October 28, 1994.

Press, Larry. "Commercialization of the Internet". Communications of the ACM, vol. 37, no. 10, p. 17. November, 1994.

Wiegers, Alex. "First Virtual Really Pays Bills". Business Journal, vol. 12, no. 40, p. 1. December 26, 1994.

Cummings, Joanne, and Knight, Fred. "Internet Service Providers to Ride a Familiar Roller Coaster". Business Communications Review, vol. 25, no. 1, p. 67. January, 1995.

Day, Jacqueline. "Industry Players in Hot Pursuit of Secure Internet Transaction Mode". Bank Systems & Technology, vol 32, no. 1. January, 1995.

Into the Cyberspace". Credit Card Management, vol. 7, no. 11, p. 34. February, 1995.

Blankenhorn, Dana. "Building the Tools for Web Commerce". Interactive Age, vol. 2, no. 8, p. 34. February 13, 1995.

Knowles, Anne. "Improved Internet Security Enabling On-Line Commerce (new services based on Secure Hypertext Transfer Protocol, Secure Sockets Layer Standards)". PC Week, vol. 12, no. 11, p. 1. March 20, 1995.

Marrinan, Michele. "First Union, Open Market Hit the Internet". Bank Systems + Technology, vol. 32, no. 5, p. 6. May, 1995.

Singleton, Andrew. "Cash on the Wirehead: You Can't Do Business on the Internet If You Can't Pay Your Bills or Get Paid. Here's How". Byte, vol. 20, no. 6, p. 71. June, 1995.

Bowers, Richard. "First Virtual Offers Unique Internet Payment System". Newsbytes News Network, p. 1. June 23, 1995.

Bowers, Richard. "First Virtual Creates Corporation of Future". Newsbytes News Network, p. 1. June 28, 1995. --.

Column 1,
Line 31, "nave" should read -- have --.

Column 2,
Line 12, "exxisting" should read -- existing --.
Lines 29 and 37, "vender," should read -- vendor, --.
Lines 50-51, "offer customers" should read -- offer their customers --.
Line 56, "chance" should read -- change --.

UNITED STATES PATENT AND TRADEMARK OFFICE
CERTIFICATE OF CORRECTION

PATENT NO. : 6,976,008 B2
APPLICATION NO. : 09/975839
DATED : December 13, 2005
INVENTOR(S) : Egendorf It is certified that error appears in the above-identified patent and that said Letters Patent is hereby corrected as shown below:

Column 3,
Line 29, "agrees to the" should read -- agrees to do the --.
Line 35, "vender's" should read -- vendor's --.
Line 53, "or example," should read -- for example, --.
Line 54, "or o a" should read -- or to a --.
Line 63, "provider, to the" should read -- provider, not the --.

Column 4,
Line 6, "make" should read -- made --.
Line 55, "providers" should read -- provides --.
Line 57, "Access network, an" should read -- Access network 3 can be a telephone network, a cable television network, an --.
Line 58, "Prodigy, r a" should read -- Prodigy, or a --.
Line 66, "agreement" should read -- agreements --.

Column 5,
Line 25, "form" should read -- from --.
Line 40, "from the vendor" should read -- from the exchange of information taking place between the customer and the vendor --.
Line 50, "Provider then" should read -- Provider 2 then --.
Line 61, "4.1-4.$n$and" should read -- 4.1-4.$n$ and --.
Line 65, "customer" should read -- customers --.
Line 66, "is" should read -- in --.

Column 6,
Line 1, "services" should read -- service --.
Lines 7 and 14, "form" should read -- from --.
Line 26, "sued" should read -- used --.
Line 39, "VISA, Mastercard" should read -- VISA or Mastercard --.
Line 44, "is, t can" should read -- is, it can --.
Line 57, "or a" should read -- or an --.
Line 63, "For" should read -- for --.

Column 7,
Line 8, "amount" should read -- account --.
Line 9, "with the third" should read -- with a third --.
Line 62, "on Internet" should read -- an Internet --.

UNITED STATES PATENT AND TRADEMARK OFFICE
CERTIFICATE OF CORRECTION

PATENT NO. : 6,976,008 B2
APPLICATION NO. : 09/975839
DATED : December 13, 2005
INVENTOR(S) : Egendorf It is certified that error appears in the above-identified patent and that said Letters Patent is hereby corrected as shown below:

Column 8,
Line 8, "company an" should read -- company, an --.
Line 61, "preformed" should read -- performed --.

Column 9,
Line 3, "arced" should read -- agreed --.
Line 34, "patty" should read -- party --.

Column 12,
Line 23, "transaction." should read -- transaction; --.

Column 13,
Line 11, "by to" should read -- by the --.
Line 22, "patty" should read -- party --.
Line 45, "agreement; and" should read -- agreement, --.
Line 61, "vendor a" should read -- vendor, a --.

Column 14,
Line 67, "agreement." should read -- agreement, --.

Column 15,
Line 61, "remitted, to" should read -- remitted to --.

Column 16,
Line 18, "have to" should read -- have agreed to --.
Line 44, "tan" should read -- than --.

Column 17,
Line 23, "have to" should read -- have agreed to --.
Line 35, "to selling" should read -- to the selling --.

Column 18,
Line 29, "transaction," should read -- transaction; --.

Column 19,
Line 21, "have to" should read -- have agreed to --.
Line 64, "have to" should read -- have agreed to --.

UNITED STATES PATENT AND TRADEMARK OFFICE
CERTIFICATE OF CORRECTION

PATENT NO. : 6,976,008 B2
APPLICATION NO. : 09/975839
DATED : December 13, 2005
INVENTOR(S) : Egendorf It is certified that error appears in the above-identified patent and that said Letters Patent is hereby corrected as shown below:

<u>Column 20,</u>
Line 10, "alter" should read -- after --.
Line 16, "transaction over" should read -- transactions over --.
Line 57, "alter" should read -- after --.

<u>Column 21,</u>
Line 11, "transaction;" should read -- transaction, --.

<u>Column 22,</u>
Line 4, "have to" should read -- have agreed to --.
Line 17, "alter" should read -- after --.

This certificate supersedes Certificate of Correction issued May 9, 2006.

Signed and Sealed this

Thirteenth Day of February, 2007

JON W. DUDAS
*Director of the United States Patent and Trademark Office*

(12) United States Patent
Egendorf

(10) Patent No.: US 6,976,008 B2
(45) Date of Patent: *Dec. 13, 2005

(54) INTERNET BILLING METHOD

(75) Inventor: Andrew Egendorf, Lincoln, MA (US)

(73) Assignee: Netcraft, Corporation, Lincoln, MA (US)

( * ) Notice: Subject to any disclaimer, the term of this patent is extended or adjusted under 35 U.S.C. 154(b) by 290 days.

This patent is subject to a terminal disclaimer.

(21) Appl. No.: 09/975,839

(22) Filed: Oct. 11, 2001

(65) Prior Publication Data

US 2002/0032654 A1 Mar. 14, 2002

Related U.S. Application Data

(63) Continuation of application No. 09/568,925, filed on May 11, 2000, which is a continuation of application No. 09/057,230, filed on Apr. 8, 1998, now Pat. No. 6,188,994, which is a continuation of application No. 08/499,535, filed on Jul. 7, 1995, now Pat. No. 5,794,221.

(51) Int. Cl.$^7$ .................................................. G06F 17/60
(52) U.S. Cl. ............................ 705/40; 705/41; 705/42
(58) Field of Search .............................. 705/40, 41, 42

(56) References Cited

U.S. PATENT DOCUMENTS

| | | | | |
|---|---|---|---|---|
| 3,573,747 A | * | 4/1971 | Adams | 340/172.5 |
| 5,146,491 A | * | 9/1992 | Silver et al. | 379/114 |
| 5,329,589 A | * | 7/1994 | Fraser et al. | 379/91.02 |
| 5,394,324 A | * | 2/1995 | Clearwater | 705/8 |
| 5,446,489 A | * | 8/1995 | Egendorf | 348/3 |
| 5,737,414 A | | 4/1998 | Walker et al. | 380/4 |
| 5,845,265 A | | 12/1998 | Woolston | 705/37 |

OTHER PUBLICATIONS

Carnegie Mellon University, "Internet billing Server Prototype Scope Document INI Techinical Report 1993–1" (Oct. 14, 1993).*

* cited by examiner

*Primary Examiner*—V. Millin
*Assistant Examiner*—Daniel S. Felten
(74) *Attorney, Agent, or Firm*—Hogan & Hartson L.L.P.

(57) ABSTRACT

An Internet billing method comprises establishing an agreement between an Internet access provider and a customer, and an agreement between the Internet access provider and a vendor, wherein the Internet access provider agrees with the customer and the vendor to bill the customer and remit to the vendor for products and services purchased over the Internet by the customer from the vendor. The provider creates access to the Internet for the customer. When the customer orders a product or service over the Internet from a vendor, transactional information transmitted between the customer and the vendor is also transmitted to the provider. The provider then bills the transaction amount to the customer and remits a portion of the transaction amount to the vendor, keeping the differential as a fee for providing the service. As a result of this method, there is no need for any customer account numbers or vendor account numbers to be transmitted over the Internet, thereby maintaining the security of that information.

94 Claims, 3 Drawing Sheets